(12) United States Patent
Patterson

(10) Patent No.: US 9,657,850 B2
(45) Date of Patent: May 23, 2017

(54) HIGH PERFORMANCE SUBSEA PRESSURE REGULATOR

(71) Applicant: Proserv Operations, Inc., Houston, TX (US)

(72) Inventor: Andy Patterson, Katy, TX (US)

(73) Assignee: Proserv Operations, Inc., Houston, TX (US)

( * ) Notice: Subject to any disclaimer, the term of this patent is extended or adjusted under 35 U.S.C. 154(b) by 0 days.

(21) Appl. No.: 14/837,192

(22) Filed: Aug. 27, 2015

(65) Prior Publication Data
US 2016/0060996 A1    Mar. 3, 2016

Related U.S. Application Data

(60) Provisional application No. 62/043,030, filed on Aug. 28, 2014.

(51) Int. Cl.
| | |
|---|---|
| *E21B 33/064* | (2006.01) |
| *F16K 11/04* | (2006.01) |
| *F16K 27/02* | (2006.01) |
| *F16K 15/02* | (2006.01) |
| *F16K 25/00* | (2006.01) |
| *G05D 16/00* | (2006.01) |
| *F16K 17/04* | (2006.01) |

(52) U.S. Cl.
CPC ............ *F16K 11/04* (2013.01); *F16K 17/044* (2013.01); *F16K 17/046* (2013.01); *F16K 17/0426* (2013.01); *G05D 16/00* (2013.01)

(58) Field of Classification Search
CPC .... E21B 33/0355; E21B 34/04; E21B 33/064; F16K 11/04; F16K 15/028; F16K 25/05; F16K 27/0209
See application file for complete search history.

(56) References Cited

U.S. PATENT DOCUMENTS

| | | | | |
|---|---|---|---|---|
| 5,771,931 | A * | 6/1998 | Watson | E21B 33/0355 137/236.1 |
| 5,901,749 | A * | 5/1999 | Watson | F16K 11/048 137/625.27 |
| 6,041,804 | A * | 3/2000 | Chatufale | E21B 34/04 137/15.23 |
| 7,520,297 | B2 * | 4/2009 | Bell | G05D 16/10 137/505 |
| 2013/0146303 | A1 * | 6/2013 | Gustafson | E21B 33/0355 166/379 |

* cited by examiner

*Primary Examiner* — James G Sayre
(74) *Attorney, Agent, or Firm* — Patterson & Sheridan, L.L.P.

(57) ABSTRACT

A subsea pressure regulator includes: a spring housing; a spring disposed therein; a body having a bore formed therethrough and inlet and outlet ports; drive and balance adapters connected to opposite ends of the body; drive and balance plungers; and a supply seal assembly. Each plunger has: a piston shoulder engaged with the respective adapter, a first portion in fluid communication with an outlet chamber, and a second portion in fluid communication with ambient pressure. The supply seal assembly includes a seal carrier connected to the plungers and a seal bore formed therethrough. The spring biases the seal carrier toward an open position. The drive plunger is operable to move the seal carrier to a closed position in response to sufficient pressure in the outlet chamber overcoming the spring bias.

23 Claims, 19 Drawing Sheets

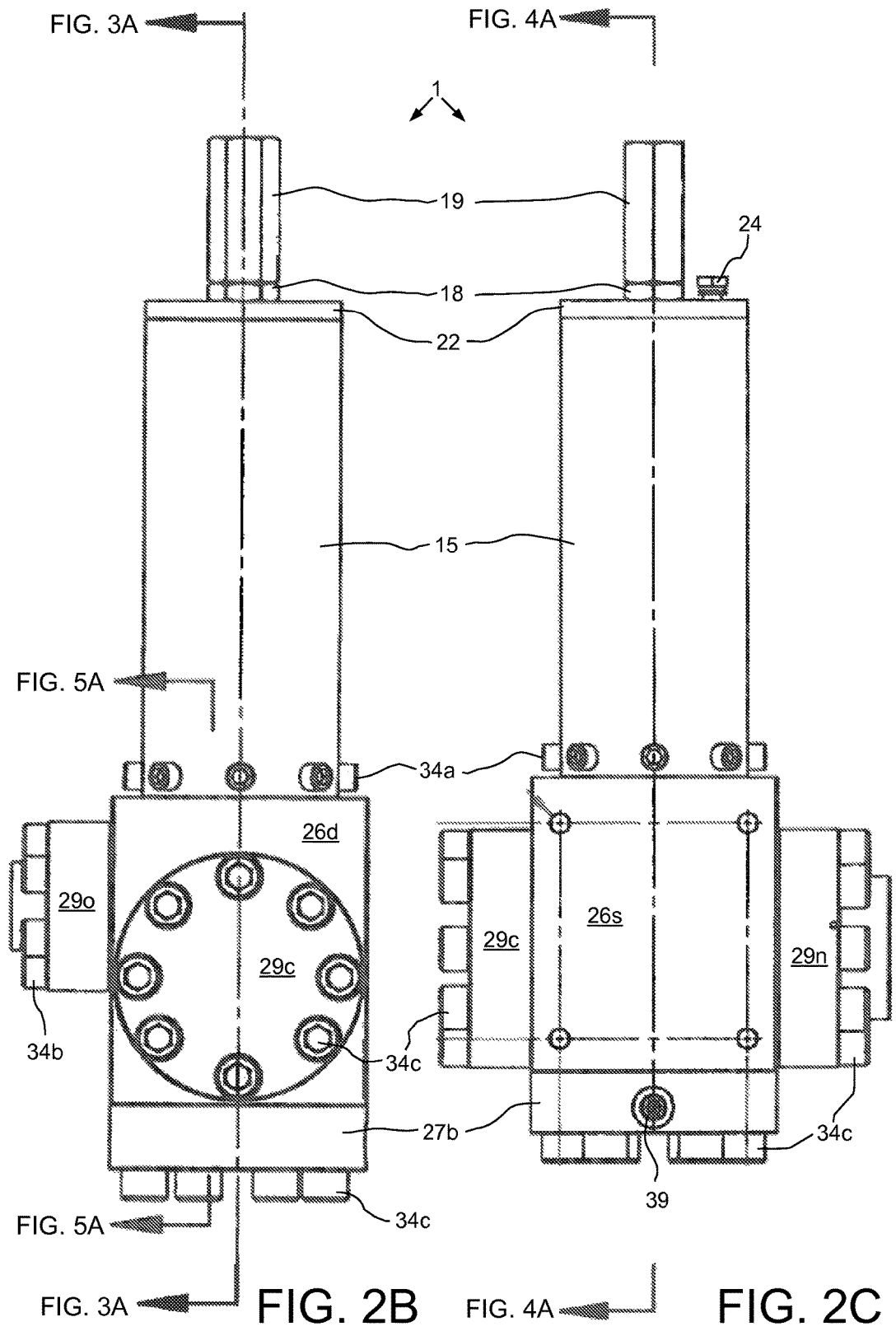

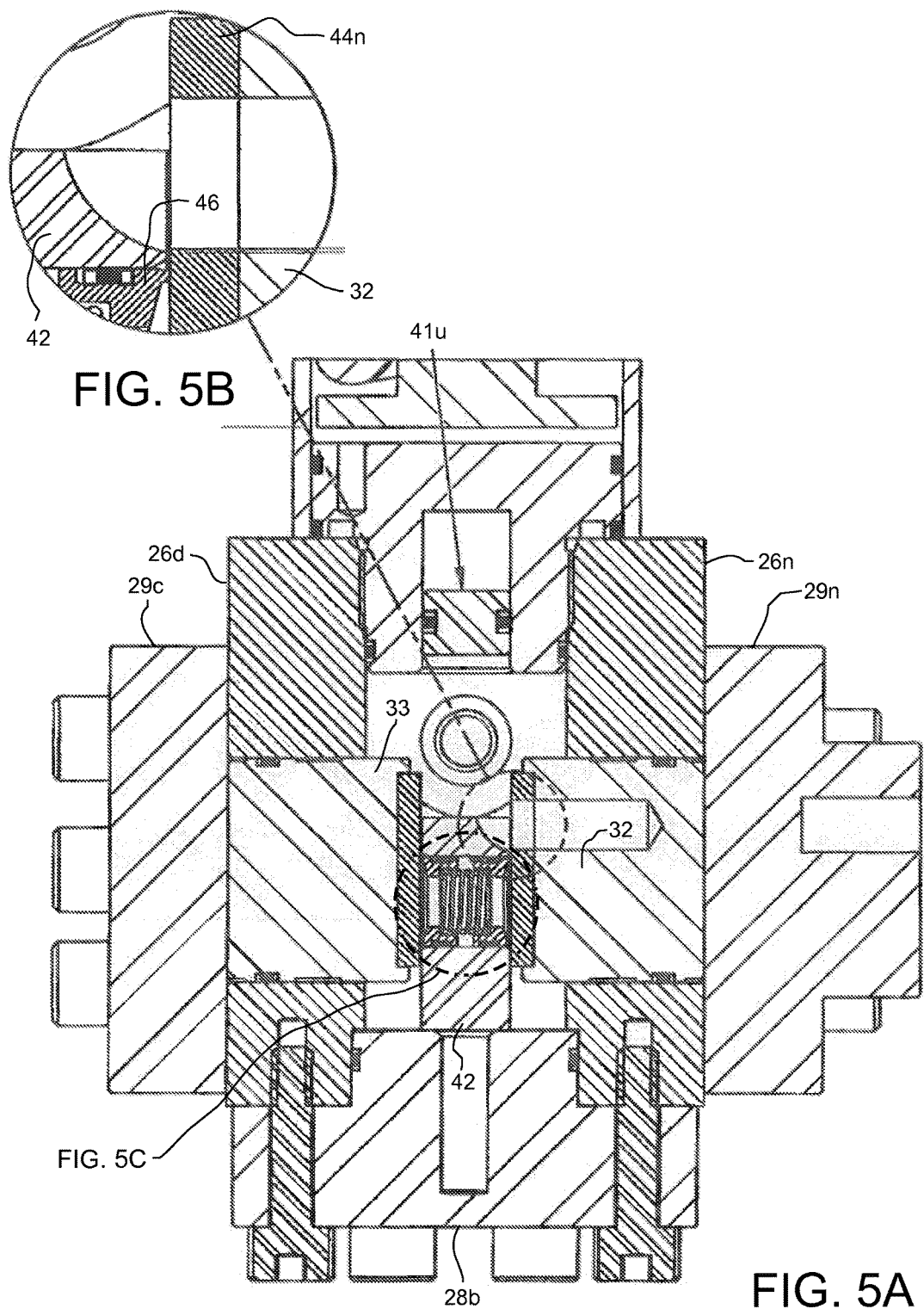

HIGH PERFORMANCE SUBSEA PRESSURE REGULATOR

BACKGROUND OF THE DISCLOSURE

Field of the Disclosure

The present disclosure generally relates to a high performance subsea pressure regulator.

Description of the Related Art

A subsea pressure regulator regulates the pressure in a line and at the inlet to valves or other components downstream therefrom by either supply pressure from the accumulators therethrough, or dumping fluid to reduce pressure. Banks of subsea accumulators receive and store high pressure fluid that is produced by hydraulic pumps that are typically located topside, i.e. on a drilling platform at the ocean surface. The inlet port of the subsea pressure regulator is connected to the accumulator banks. A function circuit(s) is connected to the outlet, or regulated function port, of the subsea regulator. As the regulated function circuit(s) consumes pressurized fluid the regulator must respond quickly to open and maintain circuit pressure at the adjusted set point. The more quickly a subsea regulator can open and respond to a drop in regulated function circuit pressure, the more constant the circuit pressure that can be maintained.

Common subsea regulators must typically produce high flow rates to pressurize energized components while utilizing a seal set which consists of both a sliding metal vent seal(s) and a sliding metal supply seal(s). The vent seal is configured to prevent regulated pressure leaking into the vent circuit. This traditional subsea regulator sliding metal vent seal arrangement creates static and dynamic friction when the subsea hydraulic system requires regulated fluid to be supplied to the outlet side of the regulator. The metal vent seal creates a potential leak path through which pressure regulated fluid could leak and result in expensive repairs and wasted stored hydraulic energy which is potentially expensive in a subsea operating environment. Typically, the differential pressure across the metal vent seal is greater than the differential pressure across the metal supply seal. Each time the subsea regulator responds and opens to restore circuit pressure, the traditional metal vent seal needs to slide or cycle thereby creating unnecessary static and dynamic friction, unnecessary wear, and a potential leak path.

The significant increase in friction generated by the traditional metal vent seal has constrained the ability to regulate high pressure high flow rates subsea with the desired low "dead band". Dead band is an industry term that describes the change in outlet pressure required to generate a dynamic response from the regulator. The traditional subsea regulator design results in a wide dead band which results in large variations in working pressures. Increased subsea operating depths and increased working pressures produce even wider dead bands due to the resulting increased differential pressure between the regulated pressure and the ambient subsea pressure.

Therefore, a need exists for a high performance subsea regulator which will minimize the characteristic dead band and produce a more constant regulated pressure.

SUMMARY OF THE DISCLOSURE

The present disclosure generally relates to a high performance subsea pressure regulator. In one embodiment, a subsea pressure regulator includes: a spring sub assembly and a body sub assembly. The spring sub assembly includes: a spring housing; and a first spring disposed in the spring housing. The body sub assembly is connected to the spring housing and includes: a body having a bore formed therethrough and inlet and outlet ports transverse to the bore; and drive and balance adapters connected to opposite ends of the body. An outlet chamber is formed between the adapters and by the bore of the body. The body sub assembly further includes drive and balance plungers. Each plunger has: a piston shoulder engaged with the respective adapter, a first portion in fluid communication with the outlet chamber, and a second portion in fluid communication with ambient pressure. The body sub assembly further includes a supply seal assembly. The supply seal assembly includes a seal carrier connected to the plungers and having a seal bore formed therethrough transverse to the bore of the body. The first spring biases the seal carrier toward an open position. The drive plunger is operable to move the seal carrier to a closed position in response to pressure in the outlet chamber sufficient to overcome the first spring bias.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 2A-2C are external views of the high performance subsea pressure regulator.

FIG. 5A is another cross section of FIG. 2B at 5A-5A showing the regulator in the fully open position. FIGS. 5B and 5C are enlargements of selected portions of FIG. 5A.

DETAILED DESCRIPTION

A pressure regulator is provided herein in which a third outlet seal is not required, resulting in lower friction and resistance to opening, thereby reducing the deadband and increasing the precision at which pressure is regulated by the regulator.

Figure 1A:
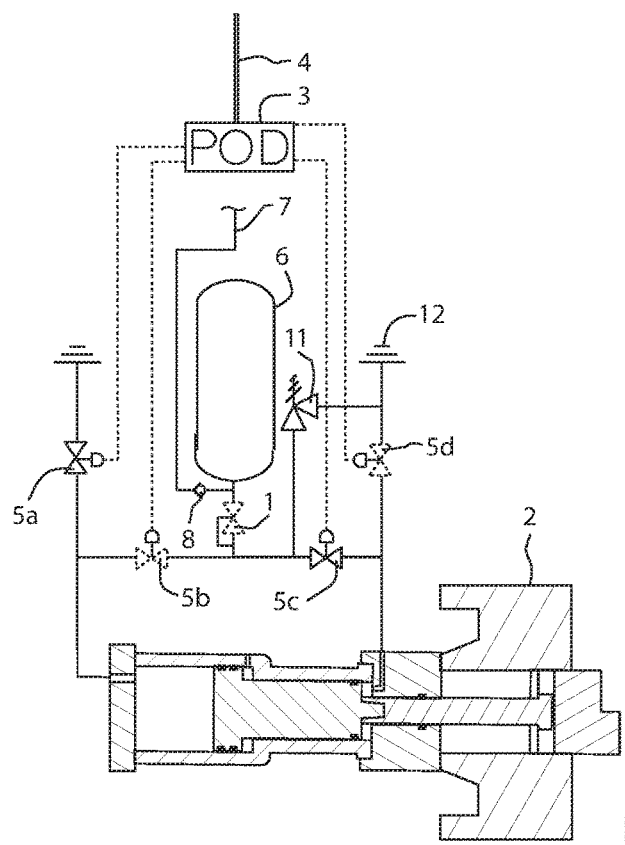
FIG. 1A illustrates closing of a blowout preventer using a high performance subsea pressure regulator, according to one embodiment of the present disclosure.
Figure 1B:
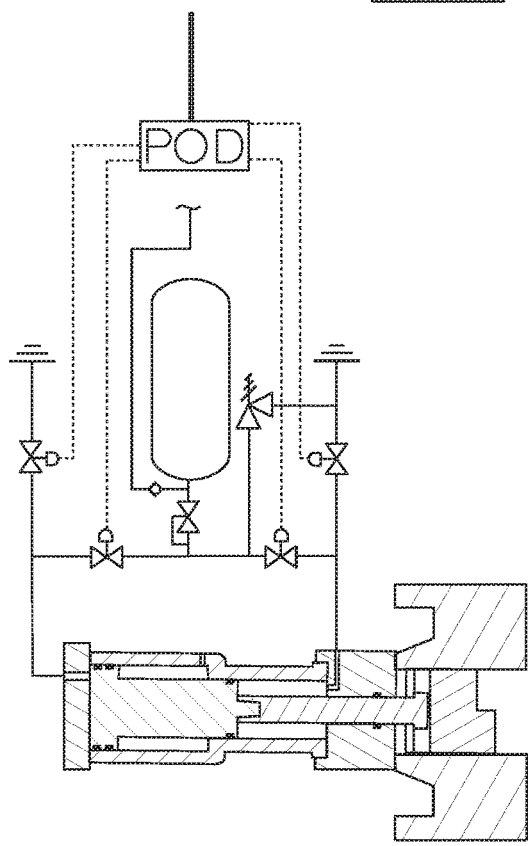
FIG. 1B illustrates the blowout preventer in an open position.

FIG. 1A schematically illustrates closed rams of a blowout preventer (BOP) 2 which were closed using a high performance subsea pressure regulator 1, according to one embodiment of the present disclosure. FIG. 1B schematically illustrates the BOP 2 in an open position. The BOP 2 may be part of a BOP stack mounted on a subsea wellhead (not shown) and employed to control a crude oil and/or natural gas well during drilling operations in the event of erratic formation pressure causing loss of pressure control, i.e., a kick, which may otherwise lead to a blowout. A lower marine riser package (LMRP) may be mounted to the BOP stack and used to secure a marine riser (not shown) extending to an offshore drilling unit (ODU) (not shown).

The BOP stack may include one or more hydraulically operated ram type blowout preventers 2 and/or one or more hydraulically operated annular type blowout preventers (not shown) connected together via bolted flanges. Each ram type blowout preventer 2 may include two opposed rams (only one ram shown) disposed within a body. The body has a bore extending therethrough that is aligned with the wellbore. Opposed cavities of the body intersect the bore and support the rams as they move radially into and out of the bore. A bonnet is connected to the body on the outer end of each cavity and supports an actuator that provides the force required to move the rams into and out of the bore. Each actuator includes a hydraulic piston to radially (linearly into, and out of, the bore in a cross bore orientation) move each ram. Each of the rams may be equipped with seals that engage against the opposed ram and prohibit flow through the bore when the rams are closed.

The LMRP commonly includes a control pod 3 in electrical, optical, and/or hydraulic communication with the ODU via an umbilical 4. The pod 3 commonly includes one or more control valves 5a-d (shown separate from the pod) and a controller. Each control valve 5a-d is in electric or hydraulic communication with the controller via an electric or hydraulic control line (unnumbered dashed lines). The BOP stack also typically includes one or more accumulators 6 for storing pressurized hydraulic fluid. The accumulators 6 are in fluid communication with one or more of the control valves 5b,c for operating the BOPs 2 of the stack.

A charge line 7 extends from the accumulators 6 to the ODU for transporting hydraulic fluid from a pump onboard the ODU to charge, i.e., pressurize, the accumulators. A check valve 8 connect the charge line 7 to the accumulator 6 and allows flow from the ODU to the accumulator for charging thereof and prevents reverse flow from the accumulator to the ODU. The pod 3 may receive command signals from the ODU via the umbilical 4 and operate the appropriate valves 5a-d in response thereto.

Although shown as shutoff valves, the control valves 5a-d may alternatively be directional valves, thereby combining the functionality of two or more valves into one valve.

The accumulator 6 may be charged to a higher pressure than necessary to operate the BOP 2, to ensure storage of sufficient fluid energy to operate the BOP several times in the event of failure of the charge pump onboard the ODU. To protect the BOP 2 from overpressure by the higher pressure, the regulator 1 is connected between the accumulator 6 and the control valves 5b,c. The regulator 1 reduces the pressure of the hydraulic fluid supplied by the accumulator 6 to an operating pressure of the BOP 2 to prevent damage to the BOP.

To close the BOP 2, the pod controller opens control valves 5b,d, to thereby supply the hydraulic fluid from the accumulator 6, through the regulator 1, and to a closer port of the BOP 2 via the open control valve 5b. Displaced hydraulic fluid may vent from an opener port of the BOP 2, through the open control valve 5d and into the sea 12, or to a reservoir (not shown) maintained at ambient pressure. To open the BOP 2, the pod controller opens the control valves 5a,c to supply the hydraulic fluid from the accumulator 6, through the regulator 1, and to the opener port via the open control valve 5c. Displaced hydraulic fluid may vent from the closer port, through the open control valve 5a and into the sea 12 or into the reservoir.

A pressure relief valve (PRV) 11 has an inlet connected between the regulator 1 and control valves 4b,c and an outlet in fluid communication with the sea 12 or the reservoir. The PRV 11 is commonly set at the design pressure of the BOP 2 to prevent overpressure of the BOP in the event of failure of the regulator 1.

Figure 2A:
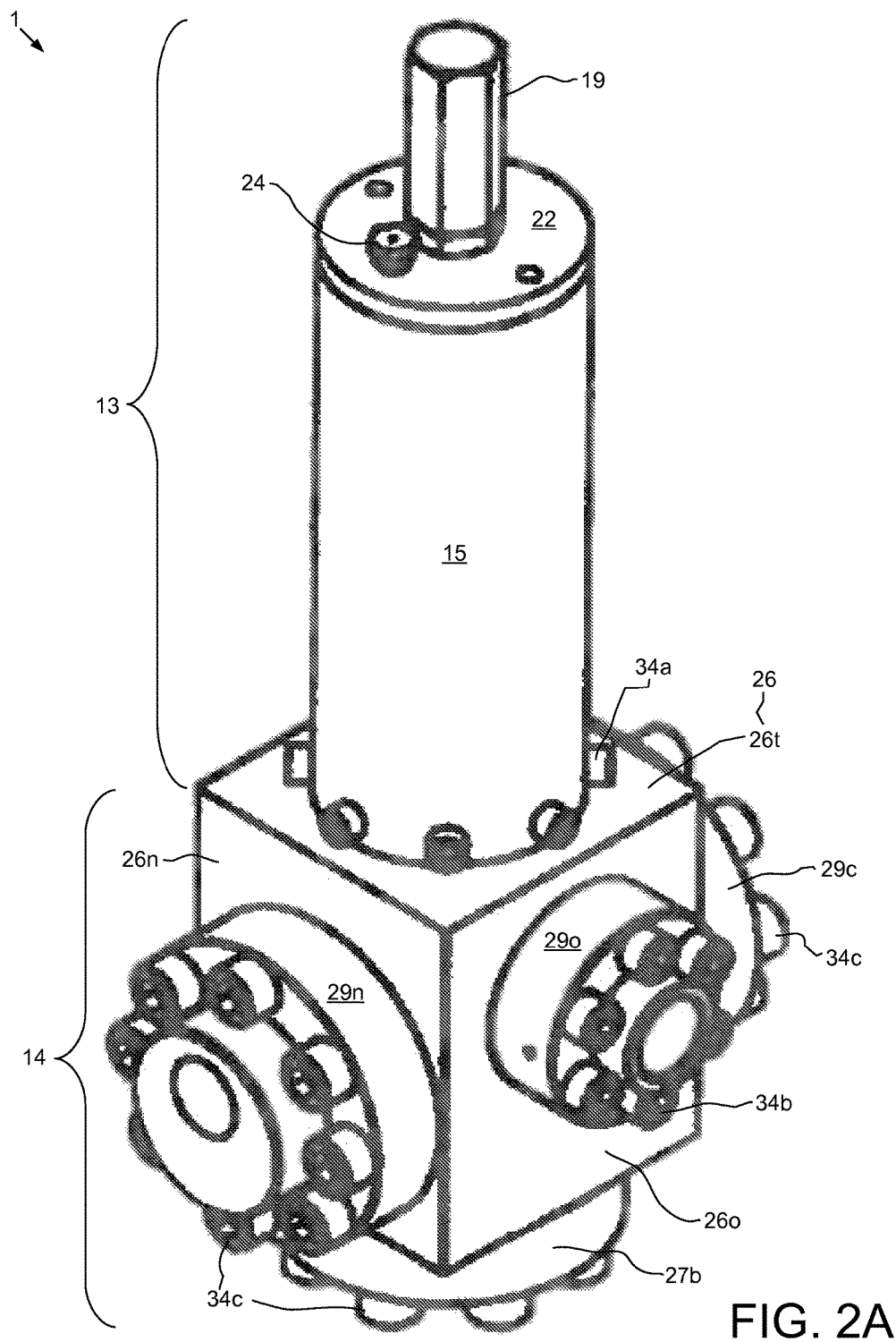
Figure 3A:
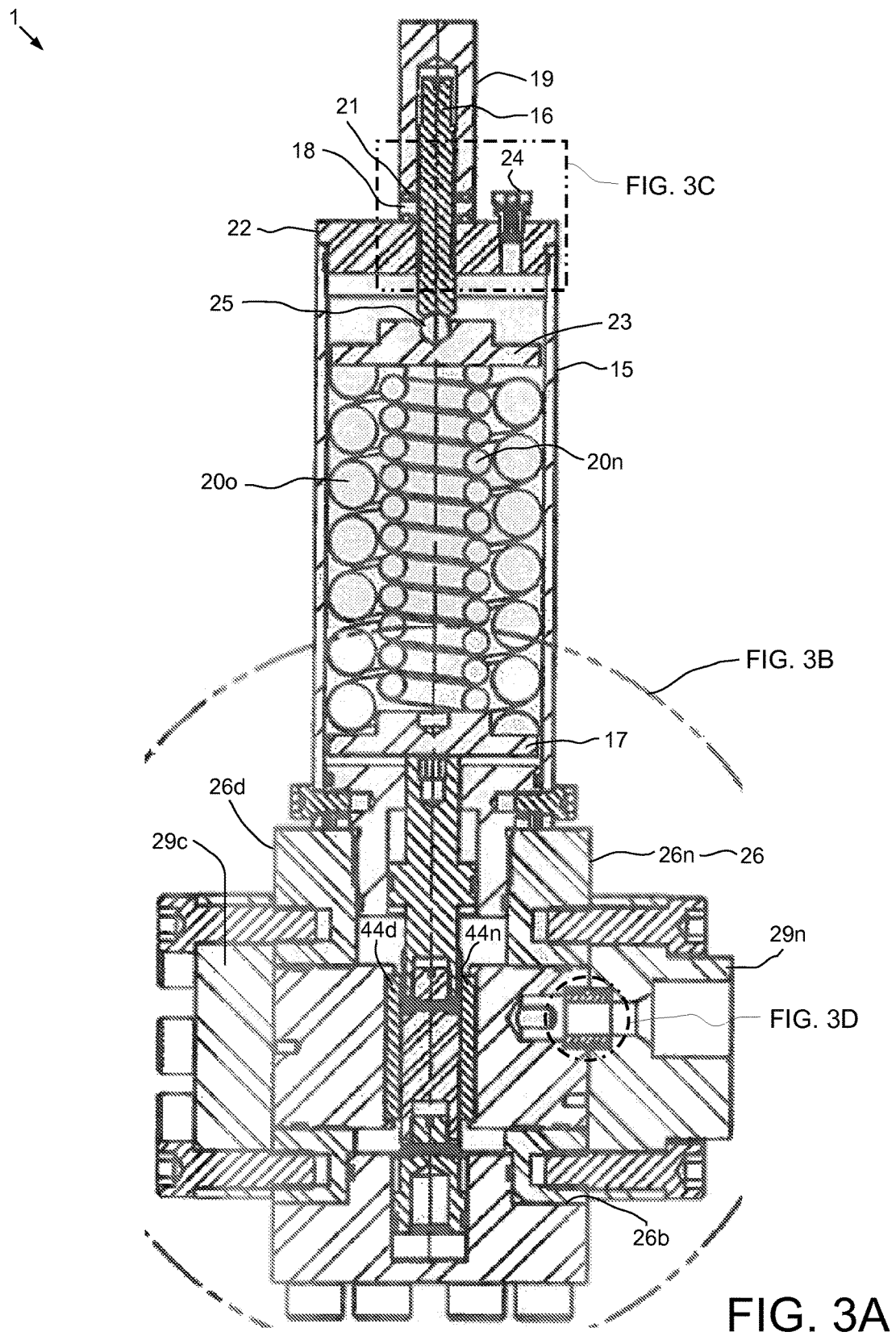
FIG. 3A is a cross section of FIG. 2B at 3A-3A showing the regulator in a fully open position.
Figure 3C:
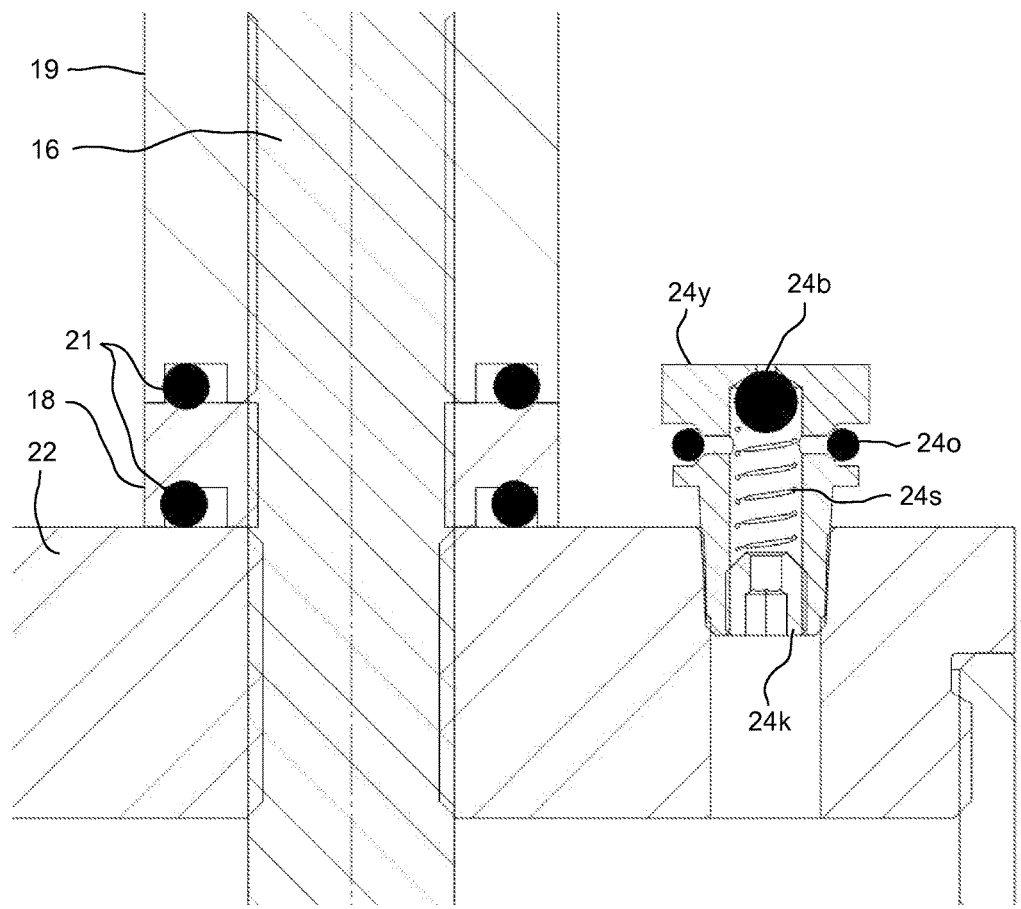
Figure 4A:
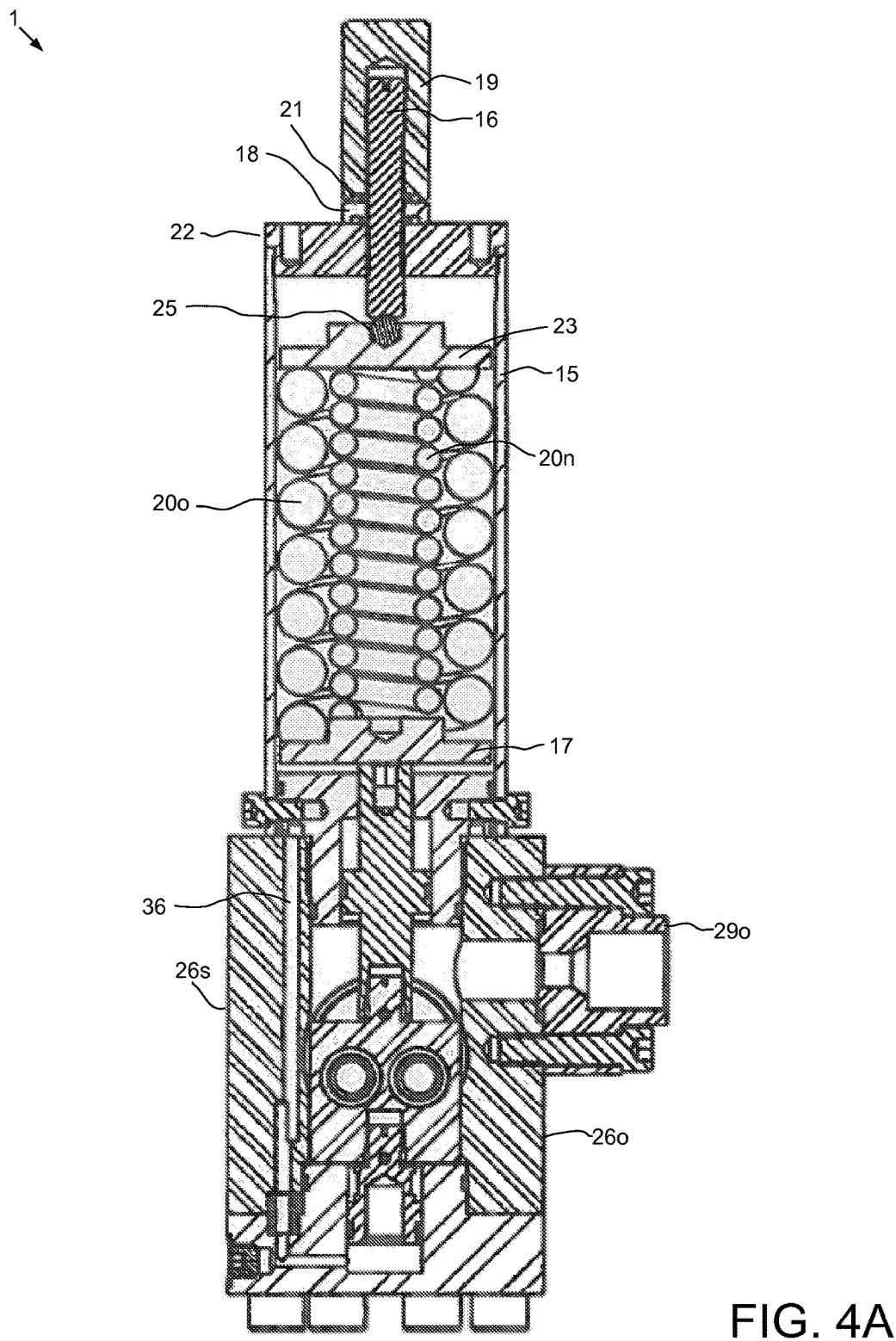
FIG. 4A is a cross section of FIG. 2C at 4A-4A showing the regulator in the fully open position.

FIGS. 2A-2C are external views of the high performance subsea pressure regulator 1. FIG. 3A is a cross section of FIG. 2B at section 3A-3A with the regulator 1 in a fully open position. FIG. 3C is an enlargement of a selected portion of FIG. 3A. FIG. 4A is a cross section of FIG. 2C at section 4A-4A with the regulator 1 in a fully open position, i.e., the pressure is communicated from the inlet to the outlet thereof. Unless otherwise specified, parts, other than seals and backup rings, of any of the regulators 1, 1a-d may each be made from a high strength metal or alloy, such as steel, stainless steel, or nickel-chromium alloy. Unless otherwise specified, seals may be made from an elastomer or elastomeric copolymer. Backup rings may be made from an engineered polymer.

The regulator 1 generally includes a spring sub assembly 13 and a body sub assembly 14. As shown in FIG. 3A, the spring sub assembly 13 includes a spring housing 15, an adjusting screw 16, a spring plate 17, a lock nut 18, a lock cap 19, one or more springs 20n,o, one or more seals 21, a plug 22, a spring guide 23, a valve 24, and a bearing 25. The spring housing 15 is, in this embodiment, is a cylindrical tube, having an inner thread formed in the inner surface thereof at the open upper end thereof and one or more radial holes formed through the wall thereof adjacent to the lower end thereof. The plug 22 is disk shaped, having a central threaded socket formed therethrough, a peripheral threaded socket formed therethrough, and an outer shoulder from which an outer threaded surface extends at the lower end thereof for threaded receipt within the inner thread of the spring housing 15, thereby connecting the two members.

A spring chamber is formed within the bore of the spring housing 15 extending between the lower face of the plug 22 and the upper face of the body sub assembly 14. The spring guide 23 is disk shaped to match the inner geometry of the spring housing 15 and disposed in the spring chamber 15, and includes a central indentation formed in an upper face thereof and an outer shoulder formed in an upper face thereof partitioning a protruding inner portion of the upper face from a recessed outer portion thereof. In the embodiment shown in FIG. 3A, the bearing 25 is configured as a ball and is disposed in the indentation of the spring guide 23 to accommodate relative rotation of the adjusting screw 16 relative to the spring guide. The adjusting screw 16 has a central indentation in a lower face thereof to engage the upper surface of the bearing 25, and includes an outer thread formed in a shaft portion thereof, wherein the shaft portion extends through the central threaded socket of the plug 22, thereby connecting the plug 22 and the screw 16.

Right hand (clockwise) rotation of the adjusting screw 16 relative to the plug 22 moves the spring guide 23 downward, i.e., inwardly of the spring housing 15, thereby increasing the preload on the springs 20$n,o$ and left hand (counter-clockwise) rotation of the adjusting screw relative to the plug moves the spring guide upward or in a direction outwardly of the spring housing 15, thereby decreasing the preload on the springs 20$n,o$, or vice versa if the thread pitch is reversed. Once the preload on the springs 20$n,o$ is adjusted such that a set pressure of the regulator 1 corresponds to the operating pressure of the BOP 2, the adjusting screw 16 may be restrained while the lock nut 18 is tightened against the plug 22 and the lock cap 19 is tightened against the lock nut, thereby locking the adjusting screw against rotation. The springs 20$n,o$ may have a high set pressure adjustment range.

The lock cap 19 has a profiled outer surface, such as a polygon, to facilitate rotation thereof with a tool such as a wrench, and has a central threaded bore formed in a mid and lower portion thereof for receiving the adjusting screw 16 therein, and a closed upper portion. Each of the lock cap 19 and the lock nut 18 have a seal groove formed in a lower face thereof. One of the seals 21 is disposed in each seal groove for isolating respective interfaces formed between the lock nut 18 and the plug 22 and between the lock cap 19 and the lock nut, thereby isolating the upper portion of the spring chamber formed in the spring housing from the adjacent sea environment.

Referring to FIG. 3C, valve 24 is received in the peripheral threaded socket of the cap 22, and includes a body 24$y$, one or more valve members 24$b,o$, a spring 24$s$, and a spring keeper 24$k$. The body 24$y$ has a head portion, a neck portion, a shaft portion, and a bore formed therethrough. The head portion may have a profiled outer surface, such as a polygon, to facilitate rotation thereof with a tool such as a wrench, and includes a seat formed in an inner surface thereof partitioning an inlet portion of the bore from a chamber portion of the bore. The neck portion may have a seat groove formed in an outer surface thereof and one or more (two are shown) outlet ports formed through a wall thereof for providing fluid communication between the seat groove and the chamber portion. The shaft portion has an inner thread and an outer thread extending into the peripheral threaded socket of the plug 22, thereby connecting the plug 22 and the body 24$y$.

The keeper 24$k$ maintains a spring 24$s$ within the valve 24, and is disposed in the body 24$y$ and includes a bore formed therethrough and an outer thread engaged with the shaft portion inner thread, thereby connecting the two members. The first valve member 24$b$ is, in the embodiment, a ball disposed in the chamber portion which is longitudinally movable relative to the body 24$y$ between an open position (not shown) and a closed position, forming a check valve structure. The first valve member 24$b$ is biased by the spring 24$s$ to be biased against the head seat in the closed position, thereby isolating the inlet in which the valve 24 is positioned against passage of external fluid, such as seawater, therethrough. The spring 24$s$ is a compression spring disposed in the chamber portion having an upper end bearing against the first valve member 24$b$ and a lower end bearing against an upper face of the keeper 24$k$, thereby biasing the first valve member toward the closed position. The inlet portion of the valve 24 is exposed to the sea 12 when the regulator is submersed and the chamber portion is in fluid communication with the spring chamber.

During lowering of the regulator into the sea 12, hydrostatic pressure of the sea will exert a downward force on an upper portion of the first valve member 24$b$, and the pressure force may eventually be sufficient to overcome the spring force against the ball (first valve member 24$b$). When this occurs, the first valve member 24$b$ is pushed downward away from the seat, thereby allowing seawater to fill the spring chamber until the pressure therein plus the spring force on the ball equalizes and an upward force exerted on a lower portion of the first valve member 24$b$ by the spring 24$s$ and pressure in the spring chamber cause the first valve member to return to the closed position.

The second valve member 24$o$ is configured as a circumferential seal, such as an O-ring, which is disposed in the seat groove, and is radially movable relative to the body 24$y$ between an outwardly expanded position (not shown) and a contracted position (shown). The second valve member 24$o$ is naturally biased toward the contracted position by having a natural diameter less than the seat groove such that the valve member is elastically pre-expanded in the contracted position. The second valve member 24$o$ closes the outlet ports in the retracted position, thereby isolating the spring chamber from the sea 12.

Should hydraulic fluid leak from the body sub assembly 14 into the spring chamber, and/or the pressure in the spring chamber otherwise increase such as due to thermal expansion, the increased pressure in the spring chamber can exert an outward force on an inner portion of the second valve member 24$o$ until the natural bias of the O-ring is overcome. The second valve member 24$o$ may then be expanded away from the seat groove, thereby allowing fluid in the spring chamber to bleed into the adjacent sea until pressure equalizes across the second valve member 24$o$ and an inward force exerted on an outer portion of the second valve member 24$o$ by the natural bias thereof and the hydrostatic pressure of the seawater causes the second valve member to return to the contracted position.

The valve 24 as configured above acts as a two-way check valve controlling pressure in the spring chamber to be essentially equal to ambient pressure while also acting as barrier to potential contaminates to prevent fouling of the spring chamber. Alternatively, the valve 24 may be replaced by a pressure compensator.

Figure 3B:
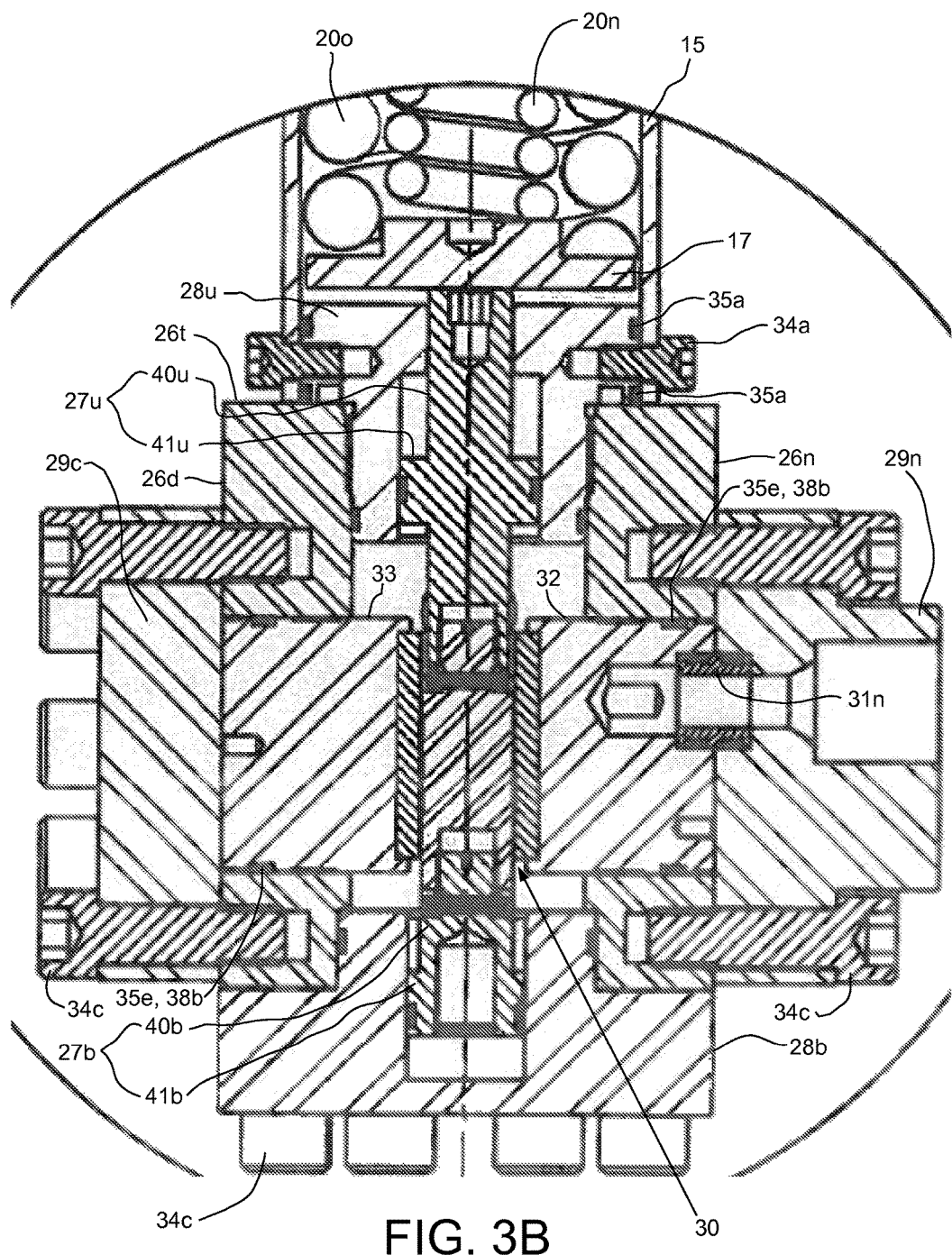
FIGS. 3B-3D are enlargements of selected portions of FIG. 3A.

Referring to FIGS. 3A and 3B, the spring plate 17 is disk shaped, and is disposed in the spring chamber adjacent the bottom thereof, i.e., on the opposite side of springs 20$o$, 20$n$ from the spring plate 23. The spring plate 17 includes a circumferential shoulder formed in an upper face thereof partitioning a protruding inner portion of the upper face from a recessed outer portion thereof. The inner spring 20$n$ and the outer spring 20$o$ are each be compression springs disposed in the spring chamber, wherein an upper end thereof bears against a lower face of the spring guide 23 and a lower end thereof bears against an upper face of the spring plate 17, thereby biasing the regulator 1 toward the fully open position. The lower end of the inner spring 20$n$ is received on the protruding upper face of the spring plate 17 and the lower end of the outer spring 20$o$ is received on the recessed upper face of the spring plate 17. The inner and outer springs 20$n,o$ are concentrically arranged in the spring chamber, thereby acting in a parallel relationship.

Figure 3D:
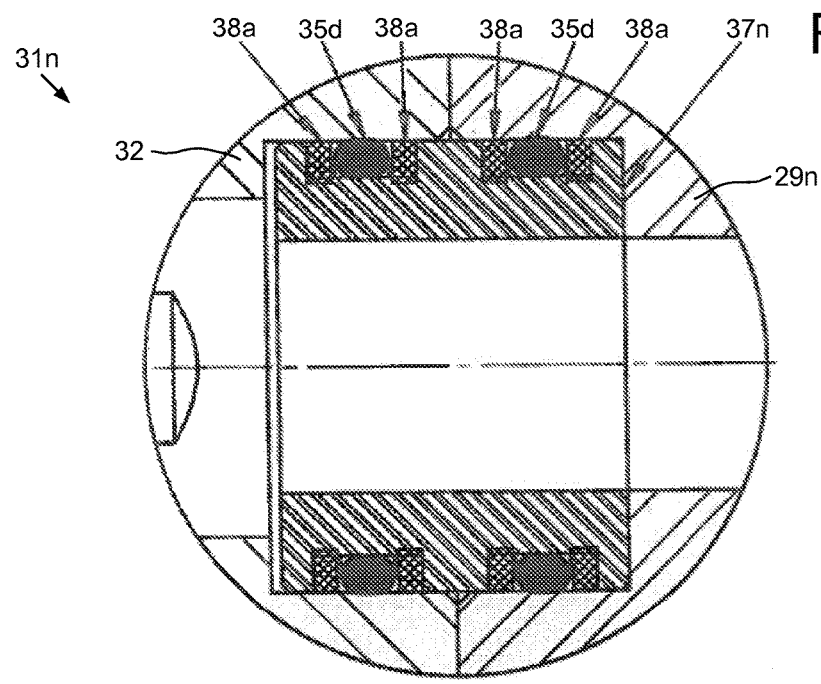
Figure 4B:
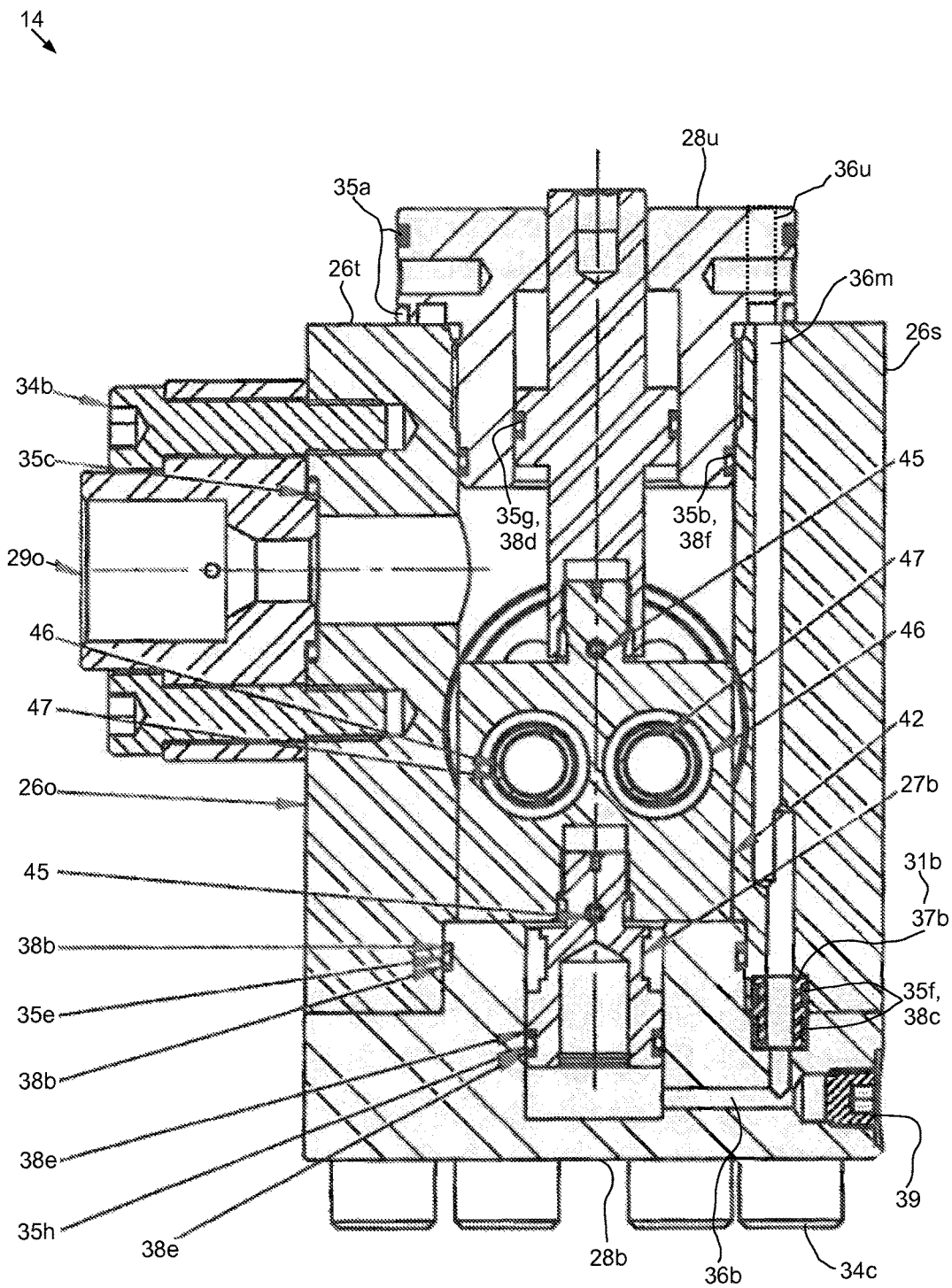
FIG. 4B illustrates a body sub assembly of FIG. 4A.
Figure 5C:
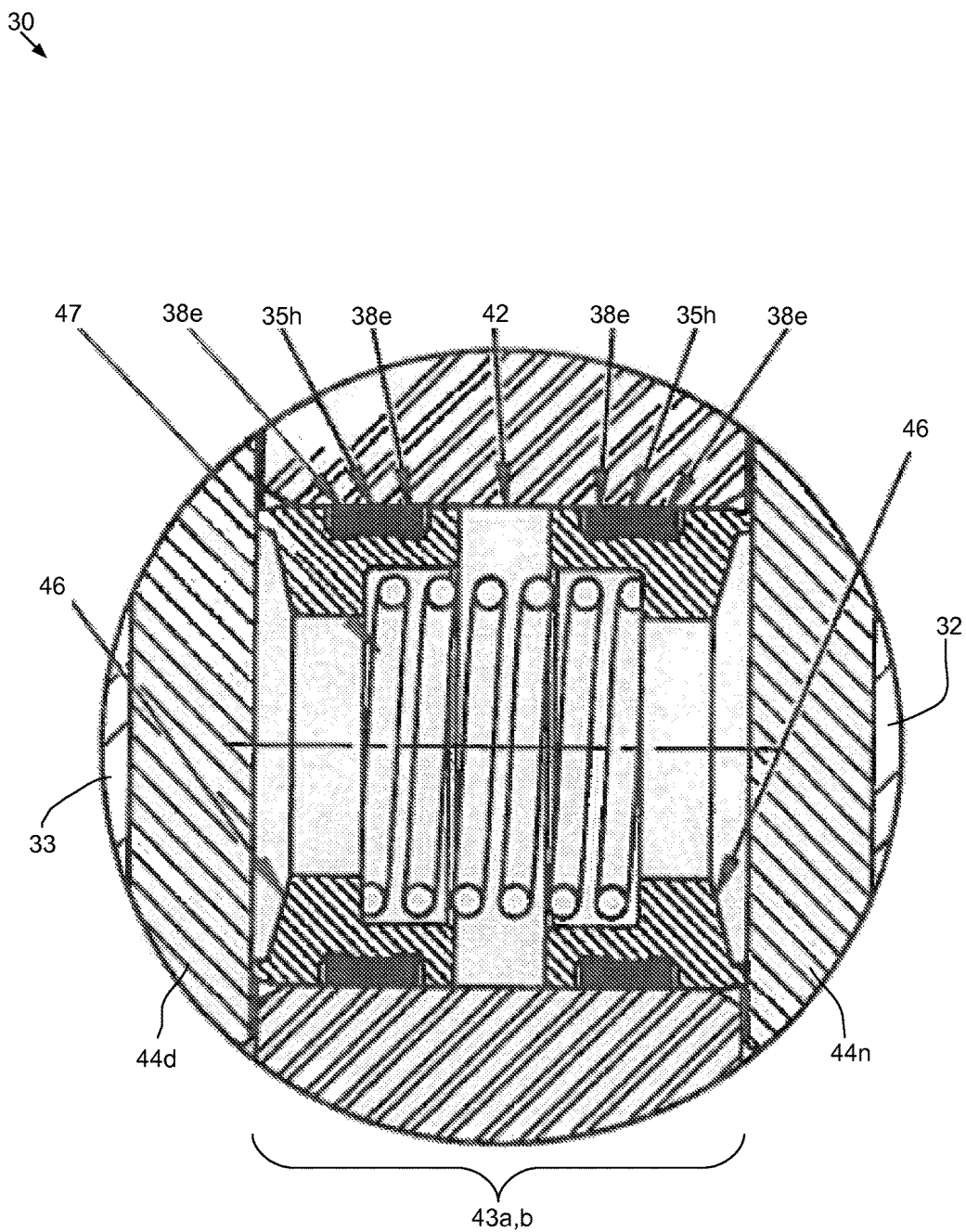

FIGS. 3B and 3D are enlarged views of selected portions of FIG. 3A. FIG. 4B illustrates the body sub assembly 14. FIG. 5A is another cross section of FIG. 2B with the regulator in a fully open position. FIGS. 5B and 5C are enlarged views of selected portions of FIG. 5A. The body sub assembly 14 includes a body 26, one or more plungers 27u,b, one or more plunger adapters 28u,b, an inlet 29n, an outlet 29o, a cover 29c, a supply seal assembly 30, one or more bridge seal assemblies 31n,b, an inlet disk 32, and a blind disk 33.

The body 26 is configured as a block, having a central vertical bore formed therethrough with an inner thread formed at a top 26t thereof, horizontal inlet and blind receiver holes formed through respective side walls 26n,d thereof, a horizontal outlet port formed through an outlet side wall 26o thereof, and a solid side wall 26s. A lower end of the spring housing 15 rests against the top 26t of the body 26 and an upper portion of the upper plunger adapter 28u is received in the spring housing bore. The upper plunger adapter 28u is annular, having an outer shoulder and an outer thread extending from a lower end thereof to the shoulder, and one or more threaded sockets formed in an outer surface thereof above the shoulder and corresponding in position to holes of the spring housing 15. Threaded fasteners 34a are inserted through the holes of the spring housing 15 and threaded into the corresponding sockets of the upper plunger adapter 28u, thereby connecting the spring sub assembly 13 and the body sub assembly 14.

The upper plunger adapter 28u also has a pair of seal grooves formed in an outer surface thereof and straddling the threaded sockets thereof, i.e., the though holes are located between the seal grooves. Seals 35a such as O-rings are disposed in the grooves and engage an inner surface of the spring housing 15 and the lower seal may also engage the body top, thereby isolating the spring chamber and a balance passage 36 (FIG. 4A) from the sea 12. An upper portion 36u of the balance passage 36 communicates with a groove formed in the shoulder of the upper plunger adapter.

The outer shoulder of the upper plunger adapter 28u is engaged against the top 26t of the body 26 and the outer threads of the upper plunger adapter engage with the inner thread of the body 26, thereby connecting the two members. The upper plunger adapter 28u also has a seal groove formed in an outer surface thereof and adjacent to the lower end thereof. A seal 35b, such as an O-ring, and a pair of backup rings 38f straddling the seal are disposed in the groove and engage an inner surface of the body 26, thereby isolating an outlet chamber of the body from the balance passage 36. The upper plunger adapter 28u also has a plunger chamber formed therein which extends from a lower end thereof to a stop shoulder formed in an inner surface thereof and a receiver bore extending from the stop shoulder to an upper end thereof.

Each holed/ported side wall 26n,o,d of the body 26 include a coupling, such as one or more threaded sockets, formed therein adjacent to the respective port thereof. A bottom 26b of the body 26 may also have a coupling, such as one or more threaded sockets, formed therein adjacent to the bore. Each of the inlet 29n and outlet 29o are configured as a flange having a port formed therethrough and have holes formed therethrough corresponding to the respective body sockets. An outlet port of the outlet side wall 26o provides fluid communication between the outlet 29o and the outlet chamber of the body 26. The outlet side 26o has a recess formed in an outer face thereof adjacent to the outlet port and the outlet 29o includes a nose extending from an inner face thereof to be received by the recess. A seal 35c, such as an O-ring, is disposed between an outer surface of the nose and a shoulder of the outlet side wall 26o defining the recess, thereby isolating the outlet ports from the sea 12. Threaded fasteners 34b are inserted through the holes of the outlet 29o and threaded into the corresponding body sockets of the outlet side 26o, thereby connecting the members.

Each of the cover 29c and the lower plunger adapter 28b are configured as blind flanges having holes formed therethrough. The holes in the cover correspond in position to the sockets of the side wall 26d and holes in the lower plunger adapter correspond in position to the threaded sockets located on the bottom 26b of the body 26. Threaded fasteners 34c are inserted through the holes of the inlet 29n, cover 29c, and lower plunger adapter 28b and threaded into the corresponding sockets of the respective body sides 26n,d/bottom 26b, thereby connecting the members. The inlet 29n, cover 29c, and lower plunger adapter 28b each have the same outer diameter. To safeguard against an error in assembly of the inlet 29n, cover 29c, and lower plunger adapter 28b, each hole pattern thereof and the respective body socket pattern are asymmetric such that each member may only align with the correct body side 26n,d/bottom 26b.

Alternatively, two of the inlet 29n, cover 29c, and lower plunger adapter 28b hole patterns may be asymmetric and one may be symmetric.

Referring to FIG. 3B, each of the inlet disk 32 and blind disk 33 are disposed in a respective receiver hole and extend into the outlet chamber. The inlet disk 32 has an inlet passage formed therethrough providing fluid communication between an inlet 29n and a supply seal assembly 30. Each of the inlet disk 32 and the inlet 29n have a recess formed in opposing faces thereof adjacent to the respective inlet port/passage. The inlet bridge seal assembly 31n is disposed in the recesses. The inlet bridge seal assembly 31n (FIG. 3D) includes an annular gland 37n having a pair of seal grooves formed in an outer surface thereof, one of each on either side of an interface formed between the inlet disk 32 and the inlet 29n. A seal 35d, such as an O-ring, and a pair of backup rings 38a on either side of the seal 35d are disposed in each gland seal groove and each seal 35d engages with an inner surface of the respective inlet disk 32 and the inlet 29n, thereby isolating the inlet port and passage from the sea 12. While the inlet bridge seal assembly 31n may be functional with only one backup ring 38a for each seal 35d, inclusion of the second backup ring safeguards against an error in assembly thereof. This safeguard may also be applied to other seals throughout the regulator 1.

Each of the inlet disk 32 and blind disk 33 have a seal groove formed in an outer surface thereof. A seal 35e, such as an O-ring, and a pair of backup rings 38b straddling the seal may be disposed in each seal groove and each seal may be engaged with an inner surface of the respective body side 26n,d, thereby isolating the outlet chamber from the sea 12.

The outlet chamber longitudinally extends between the bottom of the upper plunger adapter 28u and the top of the lower plunger adapter 28b within the body bore. The body 26 has a recess formed in an inner surface thereof adjacent to the bottom 26b and the lower plunger adapter 28b includes a central nose extending from an upper face thereof received in the recess. The lower plunger adapter nose includes a seal groove formed in an outer surface thereof and a seal 35e, such as an O-ring, and a pair of backup rings 38b straddling the seal are disposed in the seal groove and engage the recess, thereby isolating an upper portion of a lower plunger chamber from the sea 12.

Referring to FIG. 4B, the mid portion 36m of the balance passage 36 extends from the top 26t of body 26, along the solid side wall 26s, and to the bottom 26b of the body 26. The lower portion 36b of the balance passage 36 extends from an upper peripheral surface of the lower plunger adapter 26b to a lower central portion thereof. The lower plunger adapter 28b also has a plunger chamber formed therein extending from the nose to the lower end of the lower balance passage portion 36b. Each of the bottom 26b and the lower plunger adapter 28b may have a recess formed in opposing faces thereof adjacent to the respective balance passage portions 36m,b thereof, within which a balanced bridge seal assembly 31b is located (FIG. 4B). The balanced bridge seal assembly 31b includes an annular gland 37b having a pair of seal grooves formed in an outer surface thereof and straddling an interface formed between the body bottom 26b and the lower plunger adapter 28b. A seal 35f, such as an O-ring, and a pair of backup rings 38c straddling the seal are disposed in each gland seal groove and each seal is engaged with an inner surface of the respective body 26 and the lower plunger adapter 28b, thereby isolating the balance passage 36 from the sea 12.

The lower plunger adapter 28b may also have an access port extending from the lower balance passage portion 36b to an outer surface thereof. The access port may facilitate manufacture thereof and be threaded for closure by an access plug 39.

As shown in FIG. 3B, each plunger 27u,b has an inner shaft portion 40u,b and an outer piston shoulder 41u,b. Each piston shoulder 41u,b is disposed in a respective plunger chamber and it divides the respective plunger chamber into an upper portion and a lower portion. Each piston shoulder 41u,b has a seal groove formed in an outer surface thereof, and a seal 35g, such as an O-ring, and a pair of backup rings 38d straddling the seal are disposed in the upper piston seal groove and the seal engages with an inner surface of the upper plunger adapter 28u, thereby isolating the upper and lower portions of the upper plunger chamber. A seal 35h, such as an O-ring, and a pair of backup rings 38e straddling the seal are disposed in the lower piston seal groove and the seal engages with an inner surface of the lower plunger adapter 28b, thereby isolating the upper and lower portions of the lower plunger chamber.

In the embodiment, the plungers 27u,b are interconnected via the supply seal assembly 30 to act as one sliding unit. The sliding unit may also include the spring plate 17 rigidly connected therewith. The shaft portion 40u of the upper plunger 27u extends through the receiver bore of the upper plunger adapter 28u and into engagement with a lower face of the spring plate 17. An interface between the upper shaft portion 40u and the receiver bore is not sealed, thereby providing fluid communication between the upper plunger chamber upper portion and the spring chamber. The balance passage 36 provides fluid communication between a lower portion of the lower piston chamber and the spring chamber.

Pressure in the spring chamber can exert a downward force on an upper face of the upper piston shoulder 41u, a top of the upper shaft portion 40u, and an upper face of the upper shaft portion while exerting an upward force on a lower face of the lower piston shoulder 41b and a lower face of the lower shaft portion 40b. The outer diameter of the upper piston shoulder 41u is slightly greater than the outer diameter of the lower piston shoulder 41b, such as ten to thirty percent greater in diameter than the lower piston shoulder 41u outer diameter. Since the outer diameter of the upper piston shoulder 41u is slightly greater than the outer diameter of the lower piston shoulder 41b, a net downward force tending to open the regulator 1 is generated by pressurizing the spring chamber. The balancing effect of the lower plunger 27b may reduce the sensitivity of the regulator 1 to the ambient pressure of the sea 12, thereby resulting in a reduced net downward force on the plungers 27u,b due to pressurizing of the spring chamber.

Referring to FIG. 5C, the supply seal assembly 30 includes a seal carrier 42, one or more sliding seals 43a,b, and a pair of inserts 44n,d. Each of the inlet disk 32 and blind disk 33 have a groove formed in an inner face thereof and a respective insert 44n,d is disposed in, and extends inward of, the respective groove. Each insert 44n,d may be may be made from an abrasion resistant material, such as a ceramic-metal composite (aka cermet). The cermet may be tungsten carbide. Each insert 44n,d is secured in the respective groove, such as by brazing, adhesive bonding, or interference fit.

The seal carrier 42 is configured as a block having a threaded neck extending from an upper face thereof, a threaded socket extending inwardly thereof from a bottom thereof, and one or more (two shown) horizontal seal bores formed therethrough. The threaded neck is secured in a threaded socket extending inwardly from a lower face of the upper plunger shaft portion 40u. The threaded neck has a hole formed therethrough corresponding in position to a hole formed through a wall of the upper plunger shaft portion 40u. The upper plunger 27u and the seal carrier 42 are threaded together and the holes aligned for insertion of a fastener 45, such as a spring pin, thereby connecting the two members. The lower plunger shaft portion 41u has a threaded upper portion received in the seal carrier threaded socket and each have a corresponding hole formed therethrough. The lower plunger 27b and the seal carrier 42 may be threaded together and the holes aligned for insertion of a fastener 45, such as a spring pin, thereby connecting the two members.

The inlet passage of the inlet disk 32 has a branch for each seal bore of the seal carrier 42 and the inlet insert 44n has a port formed therethrough in alignment with each branch. Each sliding seal 43a,b disposed in a respective seal bore of the seal carrier 42 includes a pair of opposed mechanical seal rings 46 and a spring 47. Each mechanical seal ring 46 is formed of an abrasion resistant material, such as a cermet. The cermet may be tungsten carbide. Each mechanical seal ring 46 includes a seal groove formed in an outer surface thereof. A seal 35h, such as an O-ring, and a pair of backup rings 38e straddling the seal are disposed in each seal groove and each seal 35h is engaged with an inner surface of the seal carrier 42 adjacent the respective seal bore, thereby isolating the interface between the mechanical seal rings 46 and the seal carrier.

Each mechanical seal ring 46 has a spring shoulder formed in an inner surface thereof and a spring recess extending from an opposing face thereof. Each spring 47 is a compression spring having an end bearing against the respective spring shoulder, thereby biasing the respective mechanical seal rings 46 away from each other and into engagement with the respective inserts 44n,d.

The seal carrier 42 includes a diagonal flow channel formed in a side facing the inlet insert 44n and extending into an upper face thereof. The location of the diagonal flow channel corresponds to the ports of the inlet insert 44n to provide fluid communication between the inlet passage and ports, and the outlet chamber and ports.

An interface between solid sides of the seal carrier 42 and solid inlet 26s side and outlet 26o side of the body 26 are not sealed, thereby allowing fluid communication between the lower plunger chamber upper portion and the outlet chamber. Pressure in the outlet chamber may exert an upward force on an lower face of the upper piston shoulder 41u, a bottom of the upper shaft portion 40u, and a lower face of the upper shaft portion while exerting an downward force on an upper face of the lower piston shoulder 41b, a top of the lower shaft portion, and an upper face of the lower shaft portion 40b. Since the outer diameter of the upper piston shoulder 41u is slightly greater than the outer diameter of the lower piston shoulder 41b, a net upward force tending to close the regulator 1 may be generated by pressurizing the outlet chamber.

The regulator 1 is in the fully open position when the pressure in the outlet chamber is substantially less than the set pressure thereof since the net upward force exerted on the plungers 27u,b by the outlet chamber pressure is insufficient to counteract the downward force exerted by the springs 20n,o and the pressure in the spring chamber acting on the sliding unit. The lowermost position of the sliding unit is limited in the fully open position by engagement of the bottom of the seal carrier 42 with the top of the nose of the lower plunger adapter 28b. In this fully open position, the diagonal flow channel is aligned with the inlet branches and the sliding seals 43a,b are clear of the inlet branches. Hydraulic fluid from the accumulator 6 flows through the inlet 29n, the inlet disk 32, the inlet insert 44n, and the diagonal channel into the outlet chamber. The hydraulic fluid flows from the outlet chamber, the outlet body side 26o, and the outlet 29o to the BOP 2 until the outlet pressure increases and approaches the set pressure.

Figures 6A, 6B:
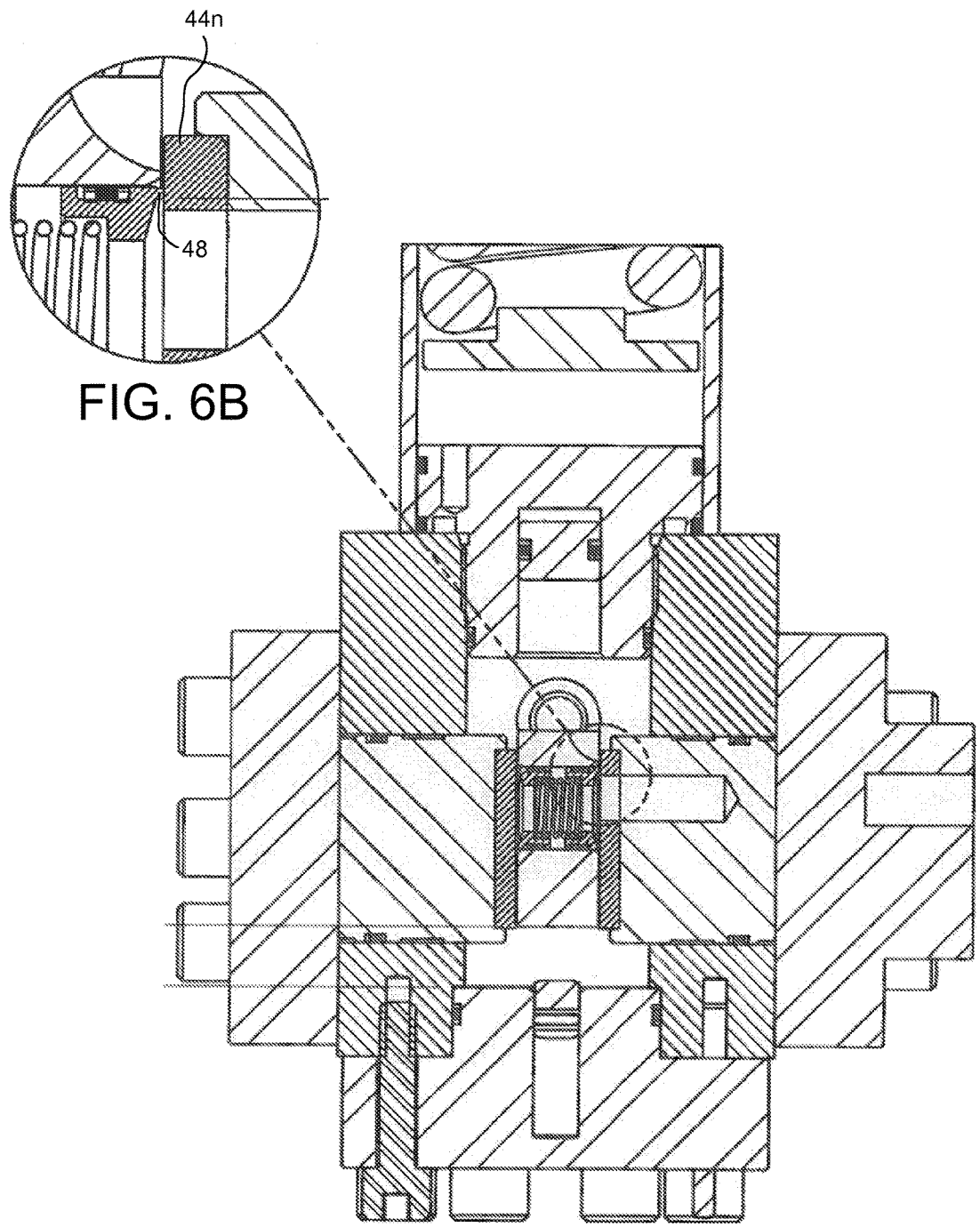
FIG. 6A is a partial cross section of the regulator in a closed position.
FIG. 6B is an enlargement of a selected portion of FIG. 6A.

FIG. 6A is a cross section of the regulator 1 in a closed position. FIG. 6B is an enlargement of a selected portion of FIG. 6A. As the outlet pressure approaches the set pressure, the net upward force on the plungers 27u,b becomes sufficient to overcome the downward force exerted by the springs 20n,o and pressure in the spring chamber, thereby moving the sliding unit upward. The sliding seals 43a,b move along the inserts 44n,d until the mechanical seal rings 46 straddle the ports of the inlet insert 44n, thereby placing the seal bores in fluid communication with the inlet branches. The seal bores are pressurized by the accumulator 6 and pressure will be exerted on the opposing faces and spring shoulders of the mechanical seal rings 46 tending to push the rings outward.

This outward force may be counteracted by the accumulator pressure exerted on distal faces of the mechanical seal rings 46. Each mechanical seal ring 46 includes an annular peripheral lip 48 formed in a distal face thereof for engagement with the respective insert 44n,d. Since the lip 48 of each mechanical seal ring 46 is engaged with the respective insert 44n,d, the exposed area of the distal faces is less than the exposed area of the opposing faces, thereby resulting in a net outward force exerted by the accumulator pressure on the mechanical seal rings 46. This net outward force acts in conjunction with the force of the spring 47 to firmly press lips of the mechanical seal rings into engagement with the respective inserts 44n,d. Energization of the sliding seals 43a,b isolates the outlet chamber from the accumulator pressure in the inlet 29n and the inlet disk 32, thereby closing the regulator 1.

Figure 7A:
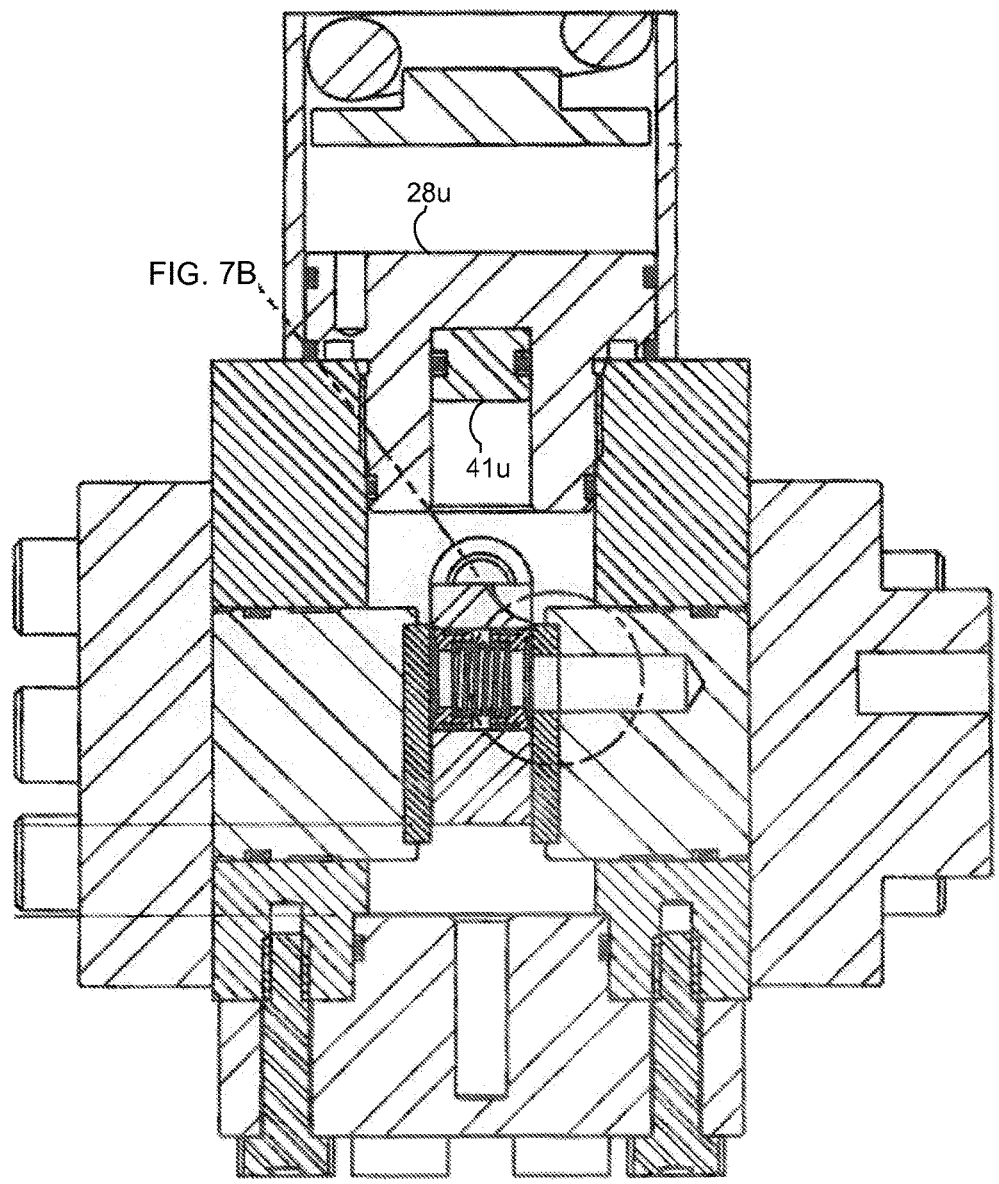
FIG. 7A is a partial cross section of the regulator in an overpressured position.
Figure 7B:
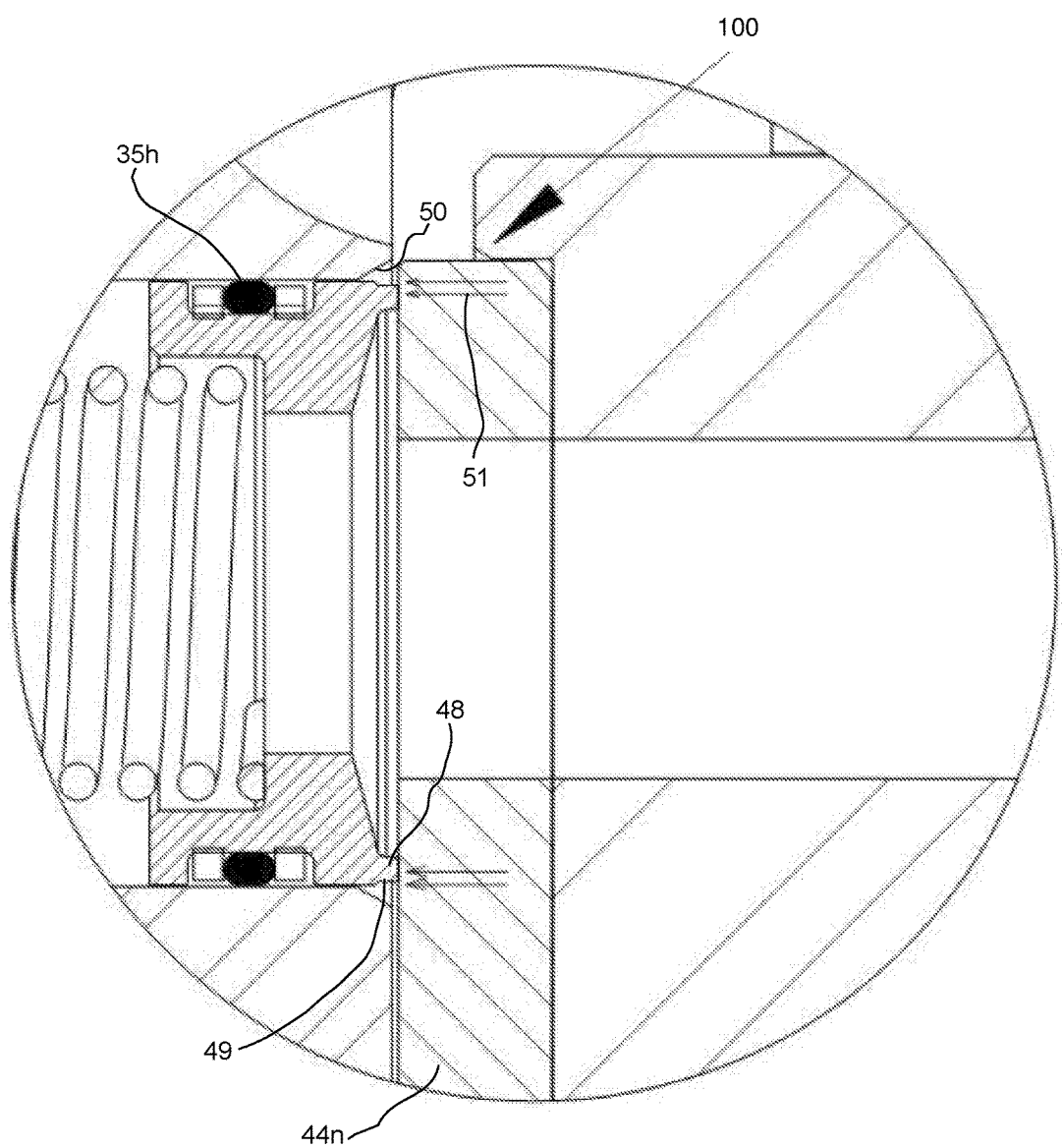
FIG. 7B is an enlargement of a selected portion of FIG. 7A.

FIG. 7A is a cross section of the regulator 1 in an overpressure position. FIG. 7B is an enlargement of a selected portion of FIG. 7A. This position may only occur if the PRV 11 fails. Assuming failure of the PRV 11, overpressure in the outlet chamber will further move the sliding unit upward until the upper face of the upper plunger piston shoulder 41u engages the stop shoulder of the upper plunger adapter 28u. The mechanical seal lips 28 will still straddle the ports of the inlet insert 44n, thereby maintaining closure of the regulator 1 in the overpressure position.

Each mechanical seal ring 46 has a recess 49 formed in, and extending inwardly of, an outer surface thereof adjacent to the lip 48. Each recess 49 is sized to align a center of the respective lip 48 with a center of the respective seal 35h. The seal carrier 42 has a chamfer 50 formed in the inner surface thereof adjacent to the respective seal bores. Should malfunction of the charge system of the accumulator 6 occur and the accumulator pressure becomes substantially less than pressure 51 in the outlet chamber, the higher outlet pressure may act on a shoulder formed in the outer surface of each mechanical seal ring 46 adjacent the respective groove 49 tending to move the mechanical seal rings inward. This higher outlet chamber pressure 51 may exert sufficient inward force on the mechanical seals 46 to compromise sealing integrity of the lips 48, thereby allowing venting of the higher outlet chamber pressure 51 through the ports of the inlet insert 44n, the inlet disk 32, and the inlet 29n.

Figure 8:
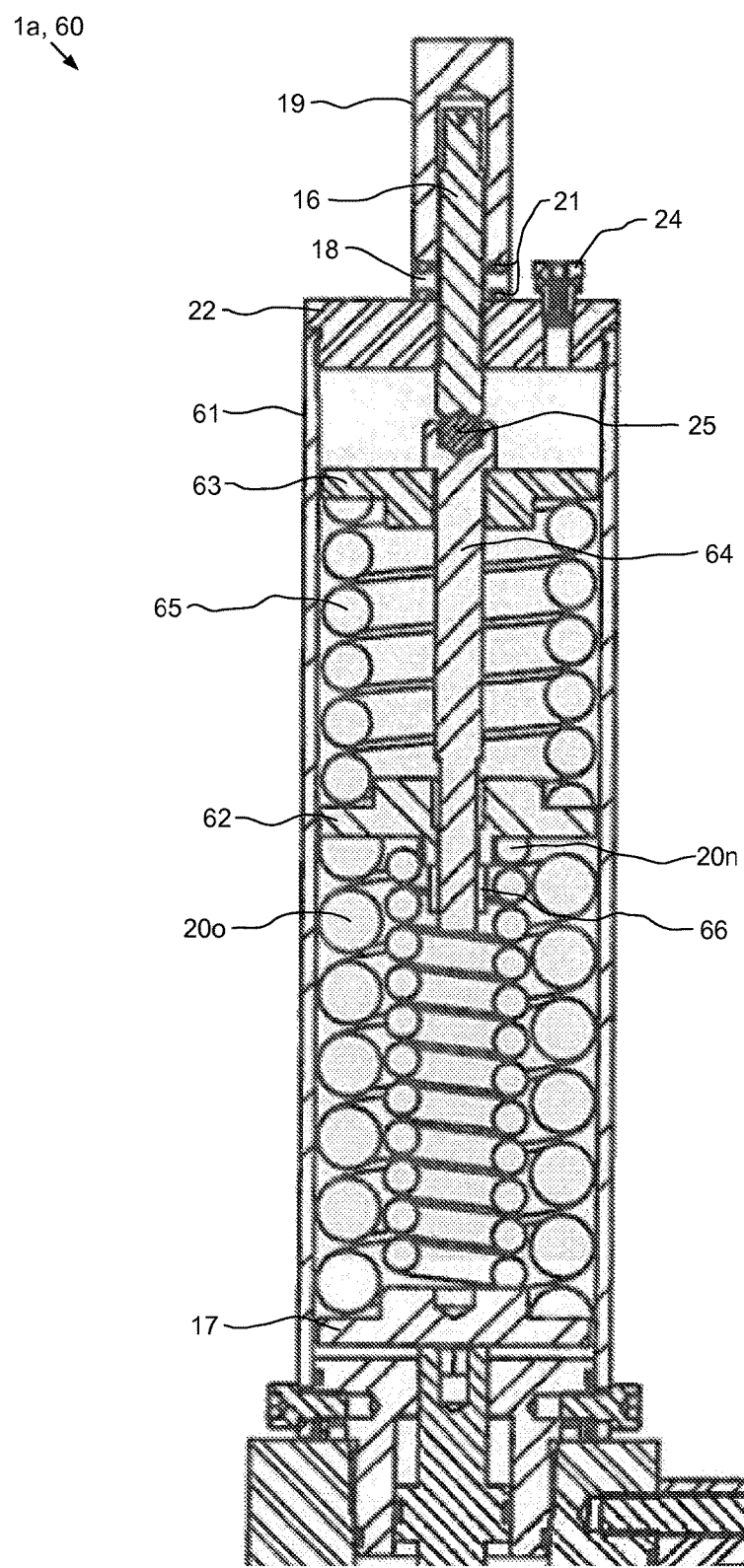
FIG. 8 illustrates a partial sectional view of an alternative regulator having an alternative spring sub assembly, according to another embodiment of the present disclosure.

FIG. 8 illustrates an alternative regulator 1a having an alternative spring sub assembly 60, according to another embodiment of the present disclosure. The alternative spring sub assembly 60 may be combined with the body sub assembly 14 instead of the spring sub assembly 13. The alternative spring sub assembly 60 includes the adjusting screw 16, the spring plate 17, the lock nut 18, the lock cap 19, the springs 20n,o, the seals 21, the plug 22, the valve 24, the bearing 25, a spring housing 61, a mid plate 62, an upper plate 63, an adjustment bolt 64, and an extender spring 65. The spring housing 61 is tubular in shape, and has an inner thread formed at an upper end thereof and one or more holes formed through a wall thereof adjacent to a lower end thereof. The plug 22 has an outer shoulder and an outer thread extending from a lower end thereof to the shoulder for receiving the inner thread of the spring housing 61, thereby connecting the two members.

A spring chamber is formed longitudinally between a lower face of the plug 22 and an upper face of the body sub assembly 14 and is surrounded by a bore formed through the spring housing 61. An adjustment bolt 64 is disposed in the spring chamber, and it has a central indentation formed in an upper face thereof. A bearing 25 is disposed in the indentation of the adjustment bolt 64 to accommodate relative rotation of the adjusting screw 16 and the adjustment bolt 64. Each of the mid plate 62 and upper plate 63 are disk shaped and include a central hole extending therethrough. The upper plate 63 has an outer circumferential shoulder formed in a lower face thereof partitioning a protruding inner portion of the lower face from a recessed outer portion thereof. The mid plate 62 also has an outer shoulder formed in an upper face thereof partitioning a protruding inner portion of the upper face from a recessed outer portion thereof and an outer shoulder formed in a lower face thereof partitioning a protruding inner portion of the lower face from a recessed outer portion thereof.

The inner spring 20n and the outer spring 20o have an upper end bearing against the recessed portion of the lower face of the mid plate 62 and a lower end bearing against the upper face of the spring plate 17. The upper end of the inner spring 20n may also engage the lower shoulder of the mid plate 62. The extender spring 65 is also a compression spring, and is disposed in the spring chamber such that the upper end thereof bears against the recessed portion of the lower face of the upper plate 63 and a lower end thereof bearing against the recessed portion of the upper face of the mid plate 62, thereby also biasing the alternative regulator 1a toward the fully open position. The extender spring 65 operates in series with the inner and outer springs 20n,o. The extender spring 65 has a stiffness substantially less than the combined stiffness of the inner and outer springs 20*n,o* to expand the set pressure adjustment range.

The adjustment bolt 64 has an upper shoulder formed in an outer surface thereof partitioning the bolt into a head portion and a shank portion and a lower shoulder partitioning the shank portion into an enlarged diameter portion and a reduced diameter threaded portion. The shank portion extends through the holes of the plates 62, 63. A lock nut 66 is engaged with the threaded shank portion of the adjustment bolt 64 for retaining the mid plate 62. The upper plate 63 is pushed against the upper shoulder by the extender spring 65. The mid plate 62 may further have a shoulder formed in an inner surface thereof adjacent to the hole thereof for engagement with the lower shoulder of the adjustment bolt 64. For set pressures between a lower portion of the adjustment range, such as between fifteen percent and thirty percent of the maximum inlet pressure, the mid plate and adjustment bolt shoulders may be disengaged. For set pressures between an upper portion of the adjustment range, the mid plate and adjustment bolt shoulders will be engaged, thereby preventing any further compression of the extender spring 65.

Figure 9A:
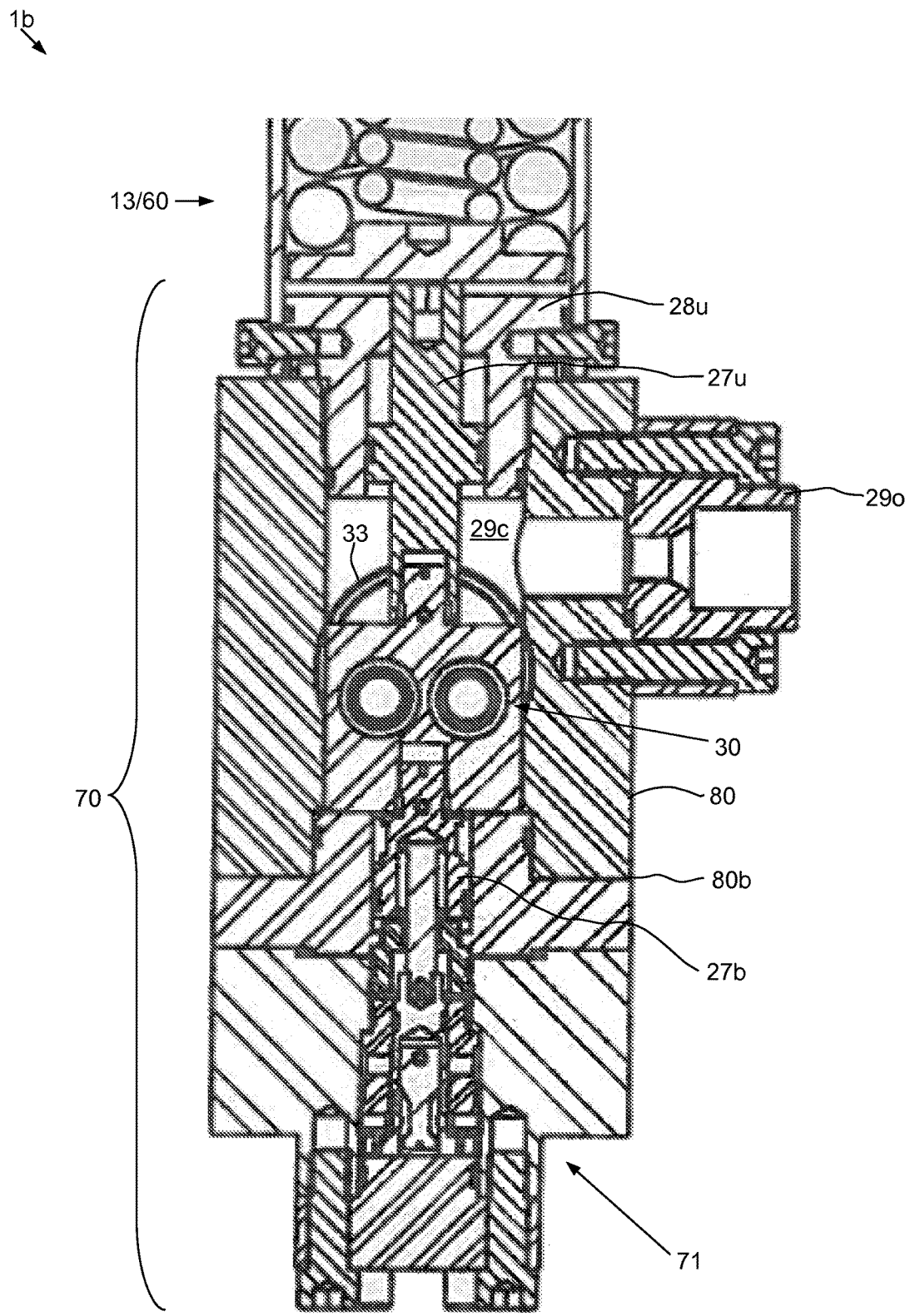
FIG. 9A illustrates partial sectional view of an alternative regulator having a vent valve, according to another embodiment of the present disclosure.
Figure 9B:
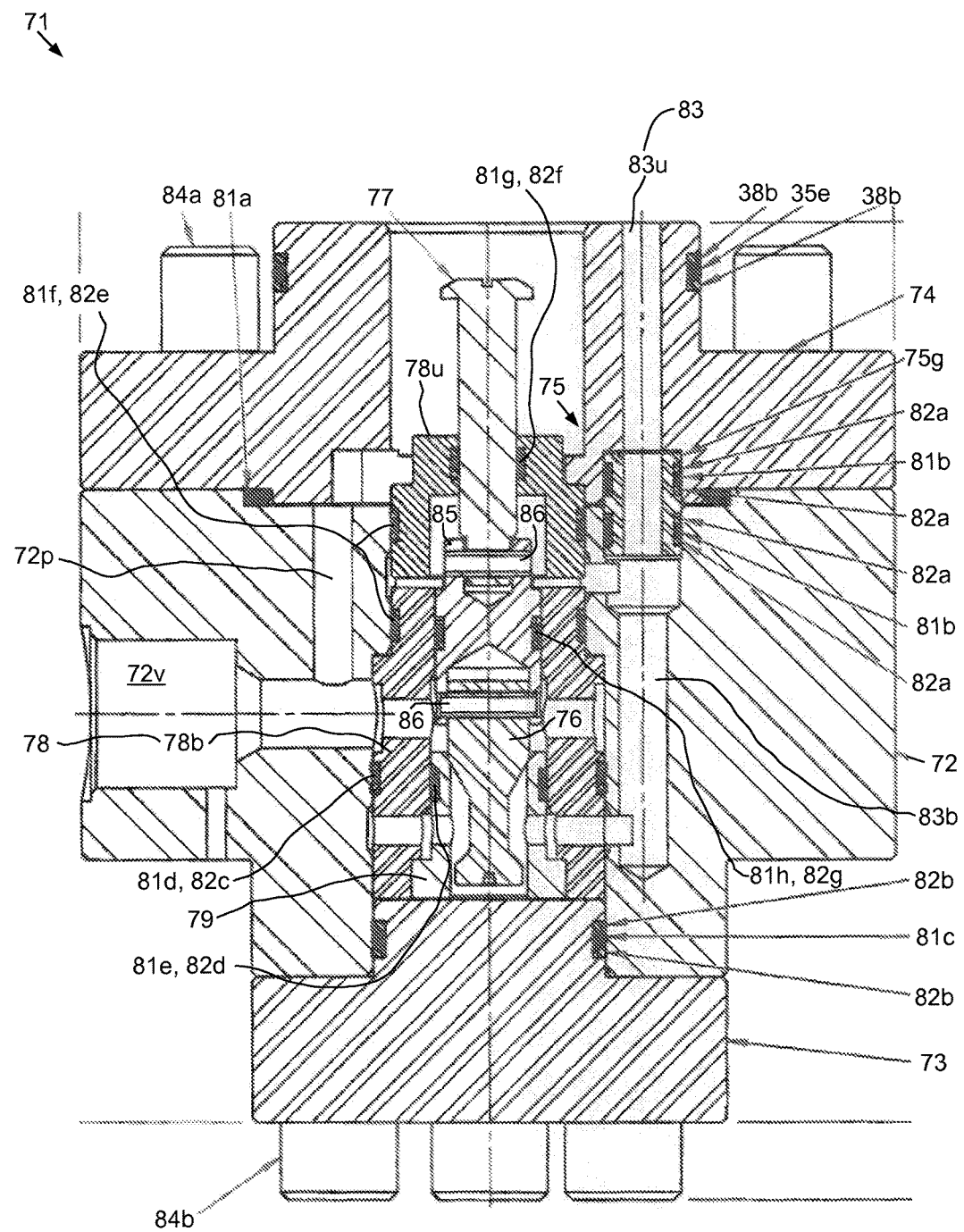
FIG. 9B illustrates the vent valve.

FIG. 9A illustrates an alternative regulator 1*b* having a vent valve 71, according to another embodiment of the present disclosure. FIG. 9B illustrates the vent valve 71. The alternative regulator 1*b* may be used to operate the BOP 2 instead of the regulator 1 and PRV 11. The alternative regulator 1*b* may include either spring sub assembly 13, 60 and a body sub assembly 70. The body sub assembly 70 may include, the plungers 27*u,b*, the upper plunger adapter 28*u*, the inlet (not shown), the outlet 29*o*, the cover 29*c*, the supply seal assembly 30, the inlet bridge seal assembly (not shown), the inlet disk (not shown), the blind disk 33, a body 80, and the vent valve 71. The body 80 may be identical to the body 26 except for the omission of the balance passage mid portion 36*m*.

The vent valve 71 includes a manifold 72, a cover 73, a lower plunger adapter 74, an outlet bridge seal assembly 75, a poppet 76, a poppet lift 77, a housing 78, a seat 79, and a poppet piston 85. Each of the lower plunger adapter 74 and manifold 72 are in this embodiment flanges having a central bore formed therethrough and peripheral holes formed therethrough corresponding is location to the threaded sockets of a bottom 80*b* of the body 80. Threaded fasteners 84*a* are inserted through the holes of the lower plunger adapter 74 and manifold 72 and threaded into the corresponding body sockets of the bottom 80*b*, thereby connecting the members. The manifold 72 includes a stem portion extending from a lower face thereof and having threaded sockets formed therein adjacent to the manifold bore.

The vent cover 73 is configured as a blind flange having peripheral holes formed therethrough corresponding to the manifold sockets. Threaded fasteners 84*b* may be inserted through the holes of the vent cover 73 threaded into the corresponding sockets of the manifold 72, thereby connecting the members. The inlet, cover 29*c*, lower plunger adapter 74, and manifold 72 may each have the same outer diameter and the vent cover 73 and outlet 29*o* each have essentially the same outer diameter. To safeguard against an error in assembly, each hole pattern of the inlet, cover 29*c*, lower plunger adapter 74, and vent cover 73 and the respective socket pattern of the body 80 and manifold 72 may be asymmetric such that each member may only align with the correct body side/bottom 80*b* and manifold 72.

The lower plunger adapter 74 has a central upper nose extending from an upper face thereof for being received by the body recess. The upper nose has a seal groove formed in an outer surface thereof and the seal 35*e* and the pair of backup rings 38*b* straddling the seal, i.e., on either side thereof, are be disposed in the seal groove and engage with the recess, thereby isolating the lower plunger chamber upper portion from the sea 12.

The manifold 72 has a vent port 72*v* formed through a wall thereof and exposed to the sea 12, in fluid communication with the reservoir, or the alternative regulator 1*b* may further include a second two-way check valve (not shown, see valve 24) screwed into the vent port. The manifold 72 also has a vent passage 72*p* extending from the vent port 72*v* to a recess formed in an upper face thereof adjacent to the bore thereof. The lower plunger adapter 74 has a central lower nose extending from a lower face thereof for being received by the manifold recess. A seal 81*a*, such as an O-ring, is located between an outer surface of the nose and a shoulder of the manifold 72 defining the recess, thereby isolating the vent passage 72*p* from the sea 12.

The lower plunger adapter bore receives the lower plunger 27*b* and serves as the lower plunger chamber. The lower plunger adapter 74 includes an inner shoulder formed in the lower face thereof for receiving the housing 78 and a notch formed in the inner shoulder to provide fluid communication between the vent passage 72*p* and the lower portion of the lower plunger chamber. An outlet passage 83 fluidly communicates with the body outlet chamber and includes therefor an upper portion 83*u* formed in a wall of the lower plunger adapter 74 and extending longitudinally through the upper and lower noses thereof, and a lower portion 83*b* formed in a wall of the manifold 72 and extending longitudinally from the recess thereof and terminating before extending through the stem thereof. The manifold 72 may also have one or more (pair shown) branch ports for proving fluid communication between the outlet passage lower portion 83*b* and the bore thereof.

Each of the manifold 72 and the lower plunger adapter 74 have a recess formed in opposing faces thereof adjacent to the respective outlet passage portions 83*u,b* thereof. The outlet bridge seal assembly 75 is disposed in the recesses. The outlet bridge seal assembly 75 includes an annular gland 75*g* having a pair of seal grooves formed in an outer surface thereof, one of each to either side of an interface formed between the manifold 72 and the lower plunger adapter 74. A seal 81*b*, such as an O-ring, and a pair of backup rings 82*a*, one to either side of the seal 81*b*, are disposed in each gland seal groove and each seal is configured to engage with an inner surface of the respective manifold 72 and the lower plunger adapter 74, thereby isolating the outlet passage 83 from the vent passage 72*p*.

The vent cover 73 includes a central nose extending from an upper face thereof for receipt by a stem portion of the manifold bore. The vent cover nose has a seal groove formed in an outer surface thereof and a seal 81*c* and the pair of backup rings 82*b*, one of each to either side of the seal 81*c*, disposed in the seal groove, and the seal engages the manifold bore stem portion, thereby isolating the outlet passage lower portion 83*b* from the sea 12.

To facilitate assembly, the housing 78 includes an upper section 78*u* and a lower section 78*b*. The lower housing section 78*b* is annular, having a bore formed therethrough, an inner shoulder and an outer shoulder, one or more vent ports formed through a wall thereof, one or more outlet ports formed through a wall thereof, and a pair of seal grooves formed in an outer surface thereof, one groove positioned on either side of each vent port. The lower housing section 78*b* is disposed in the manifold bore and constrained therein between a top of the vent cover nose and a shoulder formed in an inner surface of the manifold 72. A seal 81*d*, such as an O-ring, and a pair of backup rings 82c, one positioned one either side of the seal 81d, are disposed in the lower housing lower seal groove and the seal 81d engages with an inner surface of the manifold 72, thereby isolating the outlet passage 83 from the vent passage 72p.

The seat 79 is configured as an annular member, having a bore formed therethrough with an inner shoulder formed at an upper end thereof, an outer shoulder, a seal groove formed in an outer surface thereof, and one or more outlet ports formed through a wall thereof aligned with the lower housing vent ports. The seat 79 is disposed in the lower housing bore and trapped therein between the top of the vent cover nose and the lower housing inner shoulder. The seat 79 terminates before reaching the lower housing vent ports. A seal 81e, such as an O-ring, and a pair of backup rings 82d, one located on either side of the seal 81e, are disposed in the seat seal groove and the seal 81e is engaged with an inner surface of the lower housing section 78b, thereby isolating the outlet passage 83 from the vent passage 72p.

The upper housing section 78u is annular, having a bore formed therethrough, an outer shoulder, an inner seal shoulder partitioning the bore into an upper receiver and a lower valve chamber, and an outer seal groove and an inner seal groove. The upper housing section 78u is disposed in the manifold bore and held therein between a top of the lower housing section 78b and the notched shoulder of the lower plunger adapter 74. A gap formed between the housing sections 78u,b serves as a port providing fluid communication between the upper outlet passage branch and the valve chamber. A seal 81f, such as an O-ring, and a pair of backup rings 82e located on either side of the seal 81f, are disposed in each of the upper housing outer seal groove and the lower housing upper seal groove and each seal is engaged with an inner surface of the manifold 72, thereby isolating an upper portion of the valve chamber from the vent passage 72p and vent port 72v. A seal 81g, such as an O-ring, and a pair of backup rings 82f on either side of the seal 81g are disposed in the upper housing inner seal groove and the seal 81g engages an outer surface of the poppet lift 77, thereby isolating the upper portion of the valve chamber from the lower plunger chamber lower portion.

A sliding unit of the vent valve 71 includes the poppet lift 77, the poppet piston 85, and the poppet 76. The poppet piston 85 is annular, having an upper threaded socket extending inwardly from the top thereof, a lower threaded socket extending inwardly from the bottom thereof, and a seal groove formed in an outer surface thereof. The upper threaded socket receives a threaded lower portion of the poppet lift 77. The threaded lower portion has a hole formed therethrough corresponding to a hole formed through a wall of the poppet piston 85. The threaded connection between the poppet piston 85 and the poppet lift 77 may be threaded together and the holes aligned for insertion of a fastener 86, such as a spring pin, thereby connecting the two members. The poppet 76 has a threaded upper portion received by the poppet piston lower threaded socket and each have a corresponding hole formed therethrough. The threaded connection between the poppet 76 and the poppet piston 85 are threaded together and the holes aligned for insertion of a fastener 86, such as a spring pin, thereby connecting the two members. The poppet 76 may be nonmetallic, such as being made from an engineering polymer, such as polyetheretherketone (PEEK) or polyoxymethylene (POM).

The lower plunger 27b has a receptacle formed therein extending from the bottom face thereof. The poppet lift 77 has an outer shoulder dividing a head portion from a shaft portion thereof. The poppet lift head portion is secured in the lower plunger receptacle by a fastener 87 (FIG. 10A), such as a snap ring, engaged with a groove formed in an inner surface of the lower plunger 27b adjacent to the receptacle.

A seal 81h, such as an O-ring, and a pair of backup rings 82g one each disposed on either side of the seal 81h are disposed in the poppet piston seal groove and the seal 81h engages the inner surface of the lower housing section 78b, thereby partitioning the valve chamber into an upper portion and a mid portion. The poppet 76 has a shoulder formed in an outer surface thereof corresponding to the inner shoulder of the seat 79. Engagement of the poppet and seat shoulders partition the valve chamber into the mid portion and a lower portion. The poppet piston 85 preferably has an outer diameter greater than the inner diameter of the seat 79 and greater than an outer diameter of the shaft portion of the poppet lift 77 such that a cross sectional area of the poppet piston is slightly greater than a combined cross sectional area of the seat 79 and poppet lift shaft portion.

Figure 10A:
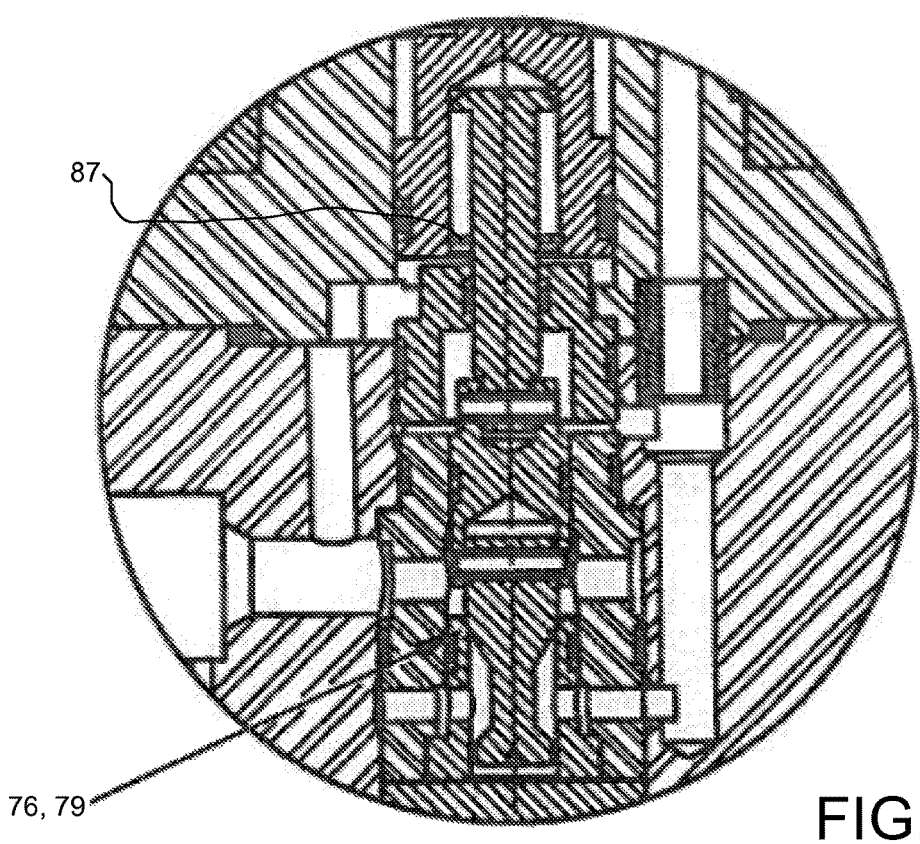
FIG. 10A illustrates the vent valve of FIG. 9A in a closed position and the regulator in the fully open position.

FIG. 10A illustrates the vent valve 71 in a closed position and the regulator 1b in the fully open position. In this vent valve 71 position, the poppet 76 is pushed downward into engagement with the seat 79, thereby closing the vent valve 71, because the outlet pressure being substantially greater than the ambient pressure of the sea 12. The outlet pressure in the valve chamber upper portion exerts a downward force on upper faces of the poppet piston 85 while simultaneously exerting an upward force on lower faces of the poppet lift 77. Outlet pressure in the valve chamber lower portion exerts an upward force on a bottom of the poppet 76 and a slight portion of shoulder thereof. Since the effective area of the poppet piston 85 is greater than the combined effective areas of the poppet lift 77 and poppet 76, a net downward force tending to close the vent valve 71 is generated by the outlet pressure in the respective valve chamber portions.

Figure 10B:
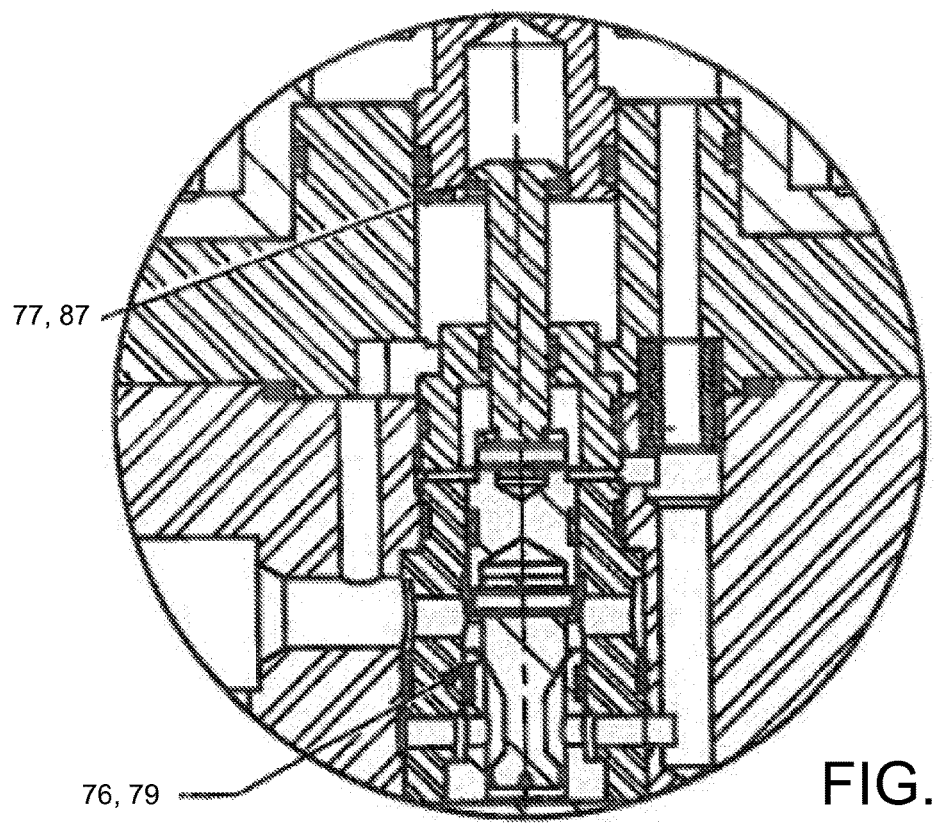
FIG. 10B illustrates the vent valve of FIG. 9A in a closed position and the regulator in the closed position.

FIG. 10B illustrates the vent valve 71 in a closed position and the regulator 1b in the closed position. As the outlet pressure approaches the set pressure and the plungers 27u,b move upward, the receptacle of the lower plunger 27b moves upward relative to the head of the poppet lift 77. The snap ring 87 will engage the poppet lift shoulder as the supply seal assembly 30 reaches the closed position.

Figure 10C:
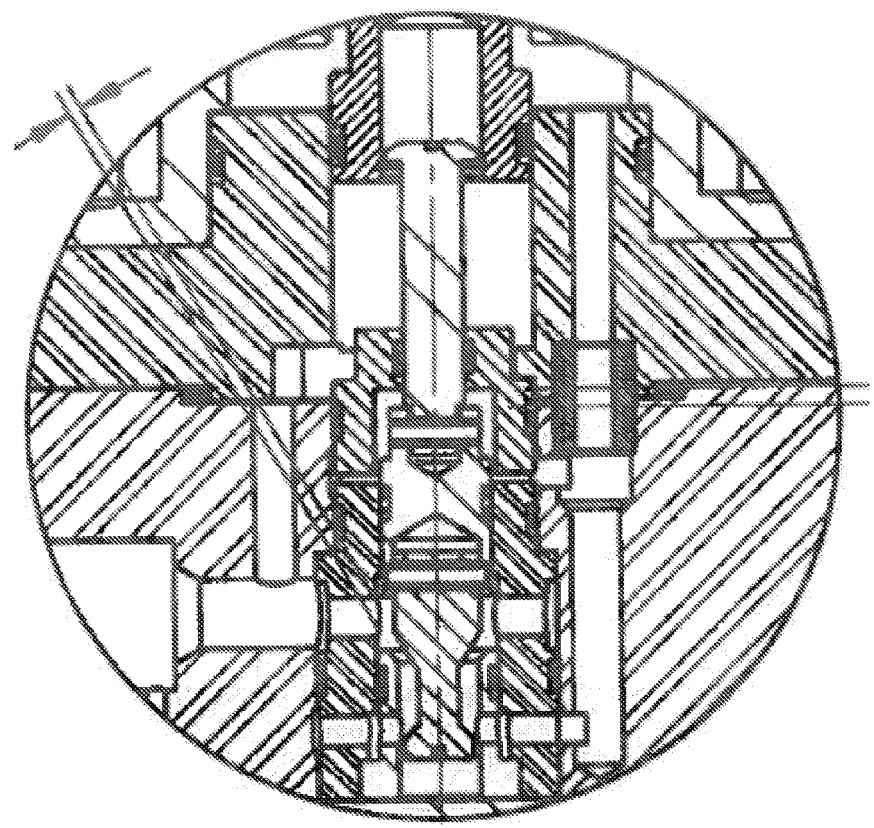
FIG. 10C illustrates the vent valve of FIG. 9A in an open position and the regulator in the overpressured position.

FIG. 10C illustrates the vent valve 71 in an open position and the regulator 1b in the overpressure position. Overpressure in the outlet chamber further moves the plungers 27u,b upward. Engagement of the snap ring 87 with the poppet lift shoulder exerts an upward force on the vent valve sliding unit sufficient to overcome the downward force exerted thereon by the poppet piston 85. The poppet 76 is lifted from the seat 79, thereby allowing excess pressure in the outlet chamber to be relieved by fluid flow through the outlet passage 83, the housing outlet ports, the seat outlet ports, the housing vent ports, and the vent port 72v.

Figure 11:
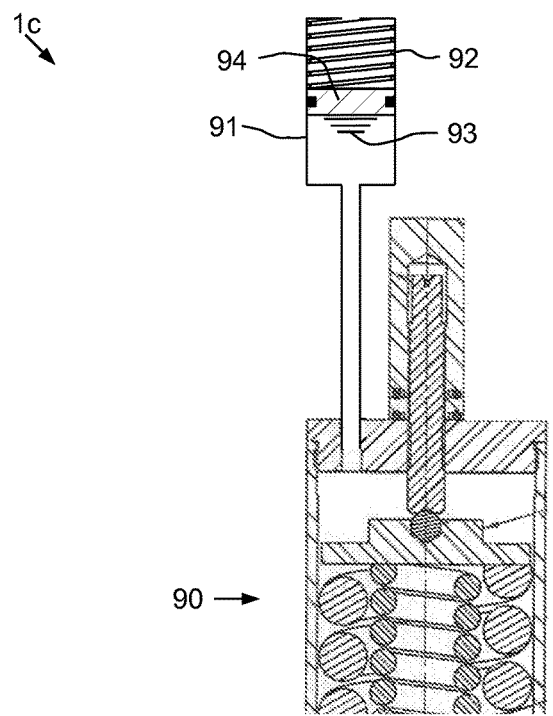
FIG. 11 illustrates a partial sectional view of an alternative regulator having a compensator, according to another embodiment of the present disclosure.

FIG. 11 illustrates an alternative regulator 1c having a compensator, according to another embodiment of the present disclosure. The alternative regulator 1c includes an alternative spring sub assembly 90 and either body subassembly (not shown). In this embodiment, the alternative spring sub assembly 90 is identical to the spring sub assembly 13 except for replacement of the valve 24 by the compensator. The compensator includes a pressure vessel 91, a spring 92, buffer fluid 93, and a balance piston 94. The vessel 91 has a chamber, an upper port in fluid communication with the sea 12, and a lower port in fluid communication with the spring chamber. The balance piston 94 is disposed in the vessel chamber and partitions the chamber into an upper portion and a lower portion. The buffer fluid 93 may be refined and/or synthetic oil or fresh water and/or antifreeze and can fill the vessel chamber lower portion and the spring chamber. The spring 92 is a compression spring and ensures that pressure in the vessel chamber lower portion is slightly greater than the ambient pressure in the upper portion.

Alternatively, the compensator may be used with any of the alternative regulators 1*a,b*.

Figure 12:
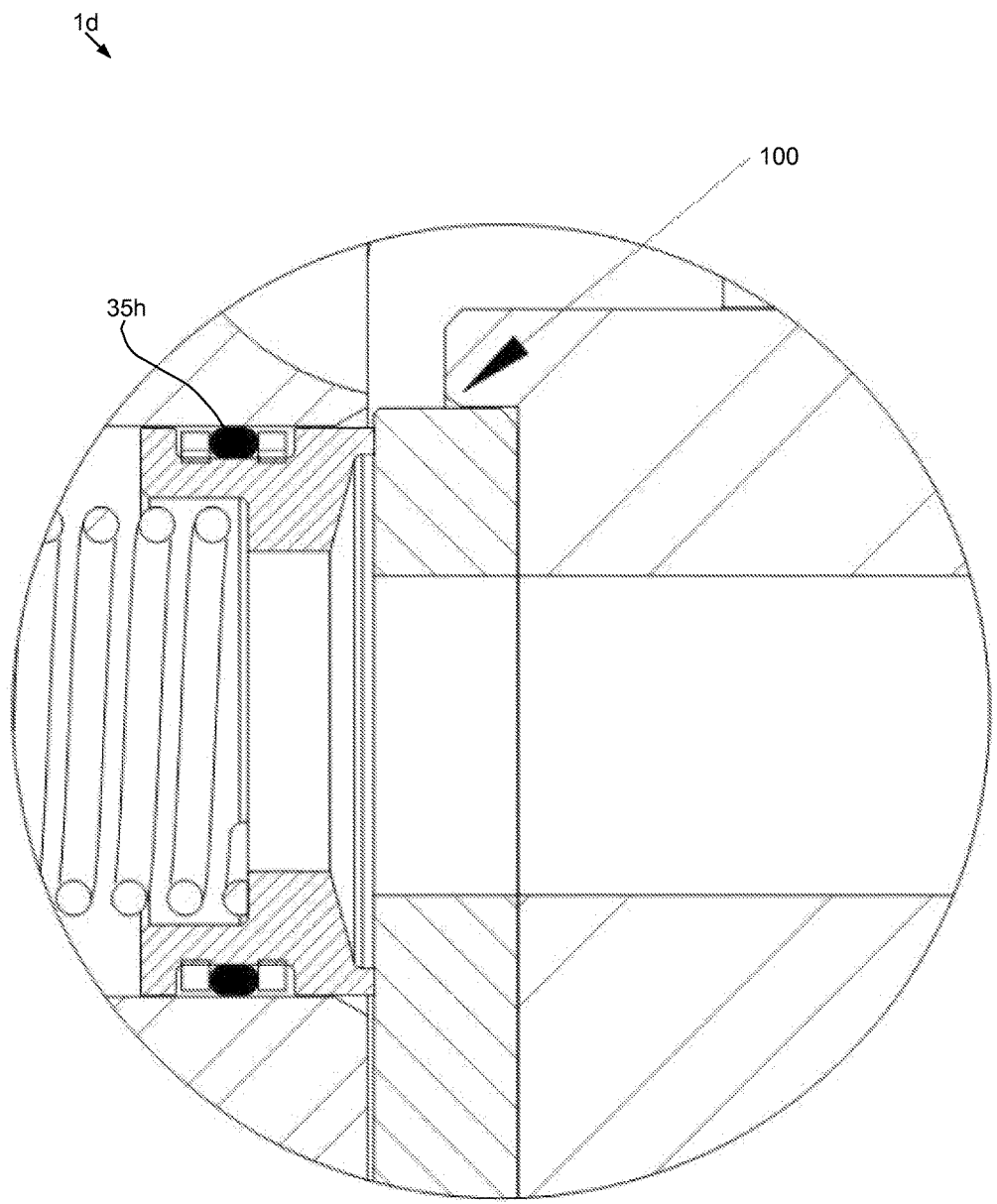
FIG. 12 illustrates an alternative supply seal assembly, according to another embodiment of the present disclosure.

FIG. 12 illustrates an alternative supply seal assembly 100, according to another embodiment of the present disclosure. An alternative regulator 1*d* is identical to any of the regulators 1, 1*a-c* except for having the alternative supply seal assembly 100 instead of the supply seal assembly 30. The alternative supply seal assembly 100 is identical to the supply seal assembly 30 except that the groove 49 is omitted from the mechanical seal rings thereof, thereby enlarging the lips thereof to have an outer diameter essentially equal to a sealing diameter of the seals 35*h*. Should malfunction of the charge system of the accumulator 6 occur and the accumulator pressure becomes substantially less than the pressure in the outlet chamber, the higher outlet pressure may not affect the seal rings which will not move inward to balance outlet chamber pressure with accumulator pressure, thereby maintaining the alternative regulator 1*d* in the closed position.

While the foregoing is directed to embodiments of the present disclosure, other and further embodiments of the disclosure may be devised without departing from the basic scope thereof, and the scope of the invention is determined by the claims that follow.

The invention claimed is:

1. A subsea pressure regulator, comprising:
   a spring sub assembly, comprising:
     a spring housing; and
     a first spring disposed in the spring housing; and
   a body sub assembly connected to the spring housing and comprising:
     a body having a bore formed therethrough and inlet and outlet ports transverse to the bore;
     drive and balance adapters connected to opposite ends of the body,
       wherein an outlet chamber is formed between the adapters and by the bore of the body;
     drive and balance plungers, each plunger having: a piston shoulder engaged with one of the respective adapters, a first portion in fluid communication with the outlet chamber, and a second portion in fluid communication with ambient pressure; and
     a supply seal assembly comprising a seal carrier connected to the plungers and having a seal bore formed therethrough transverse to the bore of the body;
   wherein:
     the first spring biases the seal carrier toward an open position, and the drive plunger is operable to move the seal carrier to a closed position in response to sufficient pressure in the outlet chamber overcoming the first spring bias wherein the supply seal assembly further comprises:
   a pair of opposed mechanical seal rings disposed in the seal bore;
   a pair of inserts connected to the body, one of the inserts having a port formed therethrough in fluid communication with the inlet port; and
   a second spring biasing the mechanical seal rings into engagement with the respective inserts.

2. The regulator of claim 1, wherein:
   the spring sub assembly further comprises a plug connected to an upper end of the spring housing, and
   a spring chamber is formed between the plug and the body sub assembly and by the spring housing bore.

3. The regulator of claim 2, wherein:
   the plug has a port formed therethrough, and
   the spring sub assembly further comprises a two-way check valve disposed in the port of the plug.

4. The regulator of claim 2, wherein:
   the plug has a threaded socket formed therethrough, and
   the spring sub assembly further comprises:
     an adjusting screw extending through the threaded socket;
     a spring guide disposed in the spring chamber;
     a bearing disposed between the spring guide and the adjusting screw;
     a spring plate disposed in the spring chamber and engaged with an upper end of the body sub assembly, and
   the first spring bears against the spring guide and the spring plate.

5. The regulator of claim 4, wherein:
   the first spring is an outer spring, and
   the spring sub assembly further comprises an inner spring disposed in the spring chamber coaxially with the outer spring.

6. The regulator of claim 2, wherein:
   the plug has a threaded socket formed therethrough, and
   the spring sub assembly further comprises:
     an adjusting screw extending through the threaded socket;
     upper and mid plates disposed in the spring chamber;
     an adjustment bolt disposed in the spring chamber and having a shank portion extending through the upper and mid plates;
     an extender spring disposed in the spring chamber and bearing against the upper and mid plates;
     a bearing disposed between the spring guide and the adjustment bolt;
     a spring plate disposed in the spring chamber and engaged with an upper end of the body sub assembly,
   the first spring bears against the mid plate and the spring plate, and
   the mid plate has a shoulder for engagement with a shoulder of the shank portion to prevent bottoming out of the extender spring.

7. The regulator of claim 2, wherein:
   the plug has a port formed therethrough, and
   the regulator further comprises a compensator, comprising:
     a pressure vessel having a first port for communication with the sea and a second port in fluid communication with the spring chamber; and
     a balance piston disposed in the vessel and in fluid communication with the ports for pressurizing buffer fluid in the vessel and spring chamber.

8. The regulator of claim 2, wherein:
   the drive adapter connects the spring sub assembly to the body sub assembly,
   the balance adapter has a plunger chamber formed therein, and
   a balance passage is formed through the drive adapter and a wall of the body and into the balance adapter to the plunger chamber, thereby providing fluid communication between the spring chamber and the plunger chamber.

9. The regulator of claim 8, wherein:
the body sub assembly further comprises a bridge seal isolating the balance passage and disposed at an interface between the body and the balance adapter, and
the bridge seal comprises:
a gland having a pair of seal grooves;
a seal ring disposed in each groove; and
a pair of backup rings disposed in each groove and straddling the seal ring, and
each seal ring is engaged with a respective one of the body and balance adapter.

10. The regulator of claim 1, wherein:
the spring housing is cylindrical and has a plurality of radial holes formed through a wall thereof,
the drive adapter is annular and has one or more threaded sockets formed in an outer surface thereof, and
the regulator further comprises a threaded fastener extending through each radial hole and screwed into the respective socket.

11. The regulator of claim 1, wherein:
the spring sub assembly further comprises a spring plate disposed in the spring housing bore,
an end of the first spring bears against the spring plate,
the drive adapter has a bore formed therethrough, and
the drive plunger extends through the drive adapter bore into engagement with the spring plate.

12. The regulator of claim 1, wherein:
the body sub assembly further comprises an inlet disk and a blind disk,
each disk is disposed in a respective hole of the body,
the inlet port is part of a passage formed through the inlet disk,
the body sub assembly further comprises an inlet flange connected to the body adjacent to the inlet disk and having an inlet port formed therethrough,
the body sub assembly further comprises a bridge seal isolating the inlet port and inlet passage and disposed at an interface between the inlet disk and inlet flange, and
the bridge seal comprises:
a gland having a pair of seal grooves;
a seal ring disposed in each groove; and
a pair of backup rings disposed in each groove and straddling the seal ring, and
each seal ring is engaged with a respective one of the inlet disk and inlet flange.

13. The regulator of claim 1, wherein:
the balance adapter is a flange or blind flange,
the body sub assembly further comprises an inlet flange and a blind flange,
the flanges have the same outer diameter, and
each hole pattern of the flanges and corresponding threaded socket pattern of the body is unique to prevent error in assembly.

14. The regulator of claim 1, wherein:
each of the mechanical seal rings and each of the inserts are made from a cermet,
the body sub assembly further comprises an inlet disk and a blind disk,
each disk is made from a metal or alloy,
each disk is disposed in a respective hole of the body, and
each insert is secured to a respective disk.

15. The regulator of claim 1, wherein:
each mechanical seal ring has a peripheral lip formed in a face thereof adjacent to the respective insert, and
each lip engages the insert.

16. The regulator of claim 15, wherein:
each mechanical seal ring has a seal groove formed in an outer surface thereof,
the supply seal assembly further comprises an elastomeric seal ring is disposed in each seal groove,
each seal ring is engaged with the seal bore.

17. The regulator of claim 16, wherein:
each mechanical seal ring further has a groove formed in an outer surface thereof adjacent to the respective lip,
each groove is sized to align a center of the respective lip with a center of the respective elastomeric seal ring.

18. The regulator of claim 16, wherein each lip has an outer diameter essentially equal to a sealing diameter of the respective elastomeric seal ring.

19. The regulator of claim 16, wherein the supply seal assembly further comprises a pair of backup rings straddling each elastomeric seal ring.

20. The regulator of claim 1, wherein:
the body sub assembly further comprises a vent valve,
the vent valve is biased toward a closed position by the outlet pressure being greater than the ambient pressure, and
the vent valve is linked to the balance plunger for opening in response to the drive plunger moving the seal carrier to an overpressure position.

21. The regulator of claim 1, wherein the body sub assembly further comprises a vent valve, comprising:
a manifold connected to the balance adapter and having a vent port formed therethrough;
a housing disposed in a bore of the manifold;
a seat disposed in a bore of the housing;
a poppet disposed in the housing and operable to engage the seat in a closed position;
a poppet lift having a head trapped in a receptacle formed in the balance plunger and a shaft extending through the housing;
a poppet piston disposed in the housing and connected to the poppet and the poppet lift; and
an outlet passage in fluid communication with the outlet chamber and formed through the balance adapter and into the manifold,
wherein:
distal portions of the poppet and poppet piston are in fluid communication with the outlet passage,
adjacent portions of the poppet and poppet piston are in fluid communication with the vent port,
the poppet piston is operable to move the poppet to the closed position in response to the outlet pressure being greater than the ambient pressure, and
the balance plunger is operable to engage the poppet lift head and open the vent valve as the drive plunger moves the seal carrier to an overpressure position.

22. A method of using the regulator of claim 1, comprising:
sending a command signal from an offshore drilling unit to a subsea control pod to close a subsea blowout preventer (BOP),
wherein:
the subsea control pod opens a control valve connected to the regulator and the subsea BOP, thereby closing the BOP,
the regulator connects the subsea BOP to a subsea accumulator, and
the regulator reduces an outlet pressure of the accumulator to an operating pressure of the subsea BOP.

23. The method of claim 22, wherein:
an inlet of a pressure relief valve (PRV) is in fluid communication with an outlet of the regulator, and the PRV is set at a design pressure of the BOP to provide overpressure protection thereto.

\* \* \* \* \*